（12）United States Patent
Wu et al.

(10) Patent No.: US 11,177,566 B2
(45) Date of Patent: Nov. 16, 2021

(54) ELECTRONIC DEVICES HAVING SHIELDED ANTENNA ARRAYS

(71) Applicant: Apple Inc., Cupertino, CA (US)

(72) Inventors: Jiangfeng Wu, San Jose, CA (US);
Lijun Zhang, San Jose, CA (US);
Siwen Yong, San Francisco, CA (US);
Yi Jiang, Cupertino, CA (US); Mattia Pascolini, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 783 days.

(21) Appl. No.: 15/898,164

(22) Filed: Feb. 15, 2018

(65) Prior Publication Data

US 2020/0227821 A1   Jul. 16, 2020

(51) Int. Cl.
| | |
|---|---|
| *H01Q 1/52* | (2006.01) |
| *H04M 1/02* | (2006.01) |
| *H01Q 21/22* | (2006.01) |
| *H01Q 1/24* | (2006.01) |

(52) U.S. Cl.
CPC .............. *H01Q 1/526* (2013.01); *H01Q 1/243* (2013.01); *H01Q 21/22* (2013.01); *H04M 1/026* (2013.01)

(58) Field of Classification Search
CPC ......... H01Q 1/243; H01Q 1/526; H01Q 21/22
See application file for complete search history.

(56) References Cited

U.S. PATENT DOCUMENTS

| | | | |
|---|---|---|---|
| 8,325,094 B2 | 12/2012 | Ayala Vazquez et al. | |
| 8,514,139 B2 | 8/2013 | Adams et al. | |
| 8,525,729 B1 | 9/2013 | Martin | |
| 8,896,487 B2 | 11/2014 | Chiang et al. | |
| 9,496,600 B2 | 11/2016 | Irci et al. | |
| 2011/0050508 A1* | 3/2011 | Guterman ............ | H01Q 1/2266 343/702 |
| 2017/0062906 A1* | 3/2017 | McAuliffe ............... | H01Q 1/06 |
| 2017/0110787 A1* | 4/2017 | Ouyang ................... | H01Q 1/40 |

* cited by examiner

*Primary Examiner* — Andrea Lindgren Baltzell
*Assistant Examiner* — Amal Patel
(74) *Attorney, Agent, or Firm* — Treyz Law Group, P.C.; Michael H. Lyons; Tianyi He

(57) ABSTRACT

An electronic device may be provided with a dielectric cover and a phased antenna array for conveying millimeter wave signals. A conductive pocket may be mounted to the cover. The pocket may include a conductive rear wall and conductive sidewalls that extend from a periphery of the rear wall to the cover. The array may be mounted to the rear wall and may convey signals through the cover. The sidewalls may extend from the cover at non-zero angles with respect to the normal axis of the cover. The shape of the pocket and the cover may be selected so that the pocket is non-resonant at frequencies handled by the array, to mitigate destructive interference within the pocket, to block surface waves from propagating along the cover, and to tweak the radiation pattern of the array to exhibit a desired shape and directionality.

15 Claims, 15 Drawing Sheets

ELECTRONIC DEVICES HAVING SHIELDED ANTENNA ARRAYS

BACKGROUND

This relates generally to electronic devices and, more particularly, to electronic devices with wireless communications circuitry.

Electronic devices often include wireless communications circuitry. For example, cellular telephones, computers, and other devices often contain antennas and wireless transceivers for supporting wireless communications.

It may be desirable to support wireless communications in millimeter wave and centimeter wave communications bands. Millimeter wave communications, which are sometimes referred to as extremely high frequency (EHF) communications, and centimeter wave communications involve communications at frequencies of about 10-300 GHz. Operation at these frequencies may support high bandwidths, but may raise significant challenges. For example, millimeter wave communications signals generated by antennas can be characterized by substantial attenuation and/or distortion during signal propagation through various mediums, can generation undesirable surface waves at medium interfaces, and can generate an excessive amount of heat.

It would therefore be desirable to be able to provide electronic devices with improved wireless communications circuitry such as communications circuitry that supports millimeter wave communications.

SUMMARY

An electronic device may be provided with wireless circuitry. The wireless circuitry may include one or more antennas and transceiver circuitry such as centimeter and millimeter wave transceiver circuitry (e.g., circuitry that transmits and receives antennas signals at frequencies greater than 10 GHz). The antennas may be arranged in a phased antenna array.

The electronic device may include a housing having a dielectric cover layer. A conductive pocket may be mounted within the housing and secured to the dielectric cover layer. The conductive pocket and the dielectric cover layer may define an enclosed cavity. The conductive pocket may include a conductive rear wall and conductive sidewalls that extend from a periphery of the conductive rear wall to an inner surface of the dielectric cover layer. A phased antenna array may be mounted to the conductive rear wall within the cavity. The conductive sidewalls may be oriented so that the conductive sidewalls extend from the dielectric cover layer at a non-zero angle with respect to the normal axis of the dielectric cover layer. The non-zero angle may accommodate a radiation pattern envelope of the phased antenna array. A heat spreader may be coupled to the conductive rear wall using thermal paste for dissipating heat away from the conductive pocket and the phased antenna array.

The phased antenna array may convey radio-frequency signals at frequencies between 10 GHz and 300 GHz (e.g., millimeter and centimeter wave signals) through the dielectric cover layer. The dimensions and shape of the conductive pocket may be selected so that the conductive pocket and the cavity are non-resonant at the frequencies handled by the phased antenna array. The dimensions and shape of the conductive pocket may also be selected to minimize or mitigate destructive interference of the radio-frequency signals within the cavity due to reflections between the interior surface of the dielectric cover layer and the conductive pocket.

As examples, the conductive sidewalls may be curved, the dielectric cover layer may be curved, the conductive rear wall may be tilted with respect to the dielectric cover layer, the conductive rear wall may be curved, the conductive cavity may be formed from an integral portion of a conductive device housing wall, the periphery of the conductive rear wall may have any desired number of straight and/or curved edges, and/or local perturbations may be formed on the conductive pocket. The conductive pocket may also block surface waves generated at the interior surface of the dielectric cover layer from escaping the cavity and may tweak the radiation pattern of the phased antenna array to exhibit a desired shape and/or directionality.

DETAILED DESCRIPTION

Figure 1:
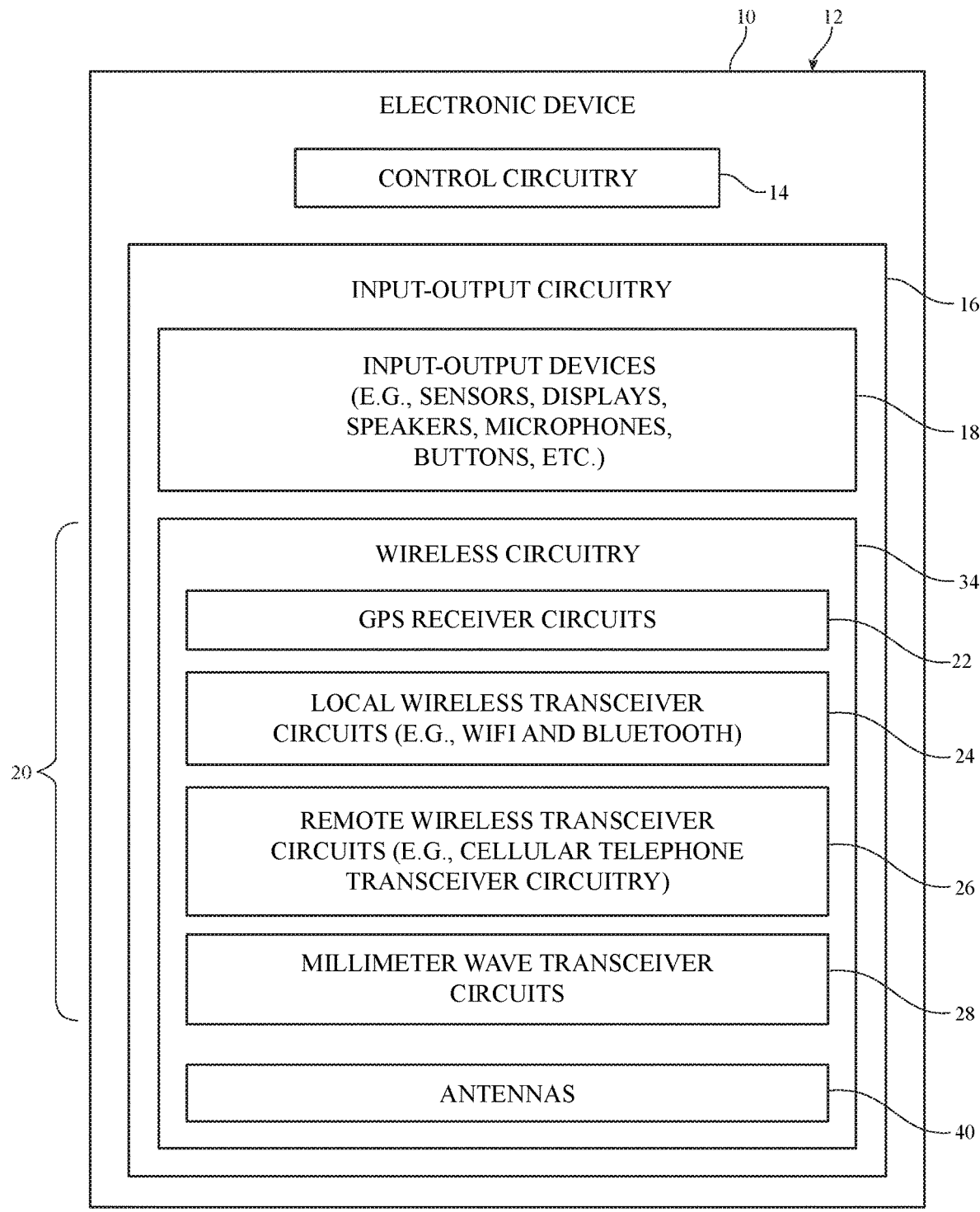
FIG. 1 is a schematic diagram of an illustrative electronic device with wireless communications circuitry in accordance with an embodiment.

Electronic devices such as electronic device 10 of FIG. 1 may contain wireless circuitry. The wireless circuitry may include one or more antennas. The antennas may include phased antenna arrays that are used for handling millimeter wave and centimeter wave communications. Millimeter wave communications, which are sometimes referred to as extremely high frequency (EHF) communications, involve signals at 60 GHz or other frequencies between about 30 GHz and 300 GHz. Centimeter wave communications involve signals at frequencies between about 10 GHz and 30 GHz. While uses of millimeter wave communications may be described herein as examples, centimeter wave communications, EHF communications, or any other types of communications may be similarly used. If desired, electronic devices may also contain wireless communications circuitry for handling satellite navigation system signals, cellular telephone signals, local wireless area network signals, near-field communications, light-based wireless communications, or other wireless communications.

Electronic devices (such as device 10 in FIG. 1) may be a computing device such as a laptop computer, a computer monitor containing an embedded computer, a tablet computer, a cellular telephone, a media player, or other handheld or portable electronic device, a smaller device such as a wristwatch device, a pendant device, a headphone or earpiece device, a virtual or augmented reality headset device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, a wireless access point or base station (e.g., a wireless router or other equipment for routing communications between other wireless devices and a larger network such as the internet or a cellular telephone network), a desktop computer, a keyboard, a gaming controller, a computer mouse, a mousepad, a trackpad or touchpad, equipment that implements the functionality of two or more of these devices, or other electronic equipment. The above-mentioned examples are merely illustrative. Other configurations may be used for electronic devices if desired.

FIG. 1 is a schematic diagram showing illustrative components that may be used in an electronic device such as electronic device 10. As shown in FIG. 1, device 10 may include storage and processing circuitry such as control circuitry 14. Control circuitry 14 may include storage such as hard disk drive storage, nonvolatile memory (e.g., flash memory or other electrically-programmable-read-only memory configured to form a solid-state drive), volatile memory (e.g., static or dynamic random-access-memory), etc. Processing circuitry in control circuitry 14 may be used to control the operation of device 10. This processing circuitry may be based on one or more microprocessors, microcontrollers, digital signal processors, baseband processor integrated circuits, application specific integrated circuits, etc.

Control circuitry 14 may be used to run software on device 10, such as internet browsing applications, voice-over-internet-protocol (VOIP) telephone call applications, email applications, media playback applications, operating system functions, etc. To support interactions with external equipment, control circuitry 14 may be used in implementing communications protocols. Communications protocols that may be implemented using control circuitry 14 include internet protocols, wireless local area network protocols (e.g., IEEE 802.11 protocols—sometimes referred to as WiFi®), protocols for other short-range wireless communications links such as the Bluetooth® protocol or other wireless personal area network protocols, IEEE 802.11ad protocols, cellular telephone protocols, MIMO protocols, antenna diversity protocols, satellite navigation system protocols, etc.

Device 10 may include input-output circuitry 16. Input-output circuitry 16 may include input-output devices 18. Input-output devices 18 may be used to allow data to be supplied to device 10 and to allow data to be provided from device 10 to external devices. Input-output devices 18 may include user interface devices, data port devices, and other input-output components. For example, input-output devices may include touch screens, displays without touch sensor capabilities, buttons, joysticks, scrolling wheels, touch pads, key pads, keyboards, microphones, cameras, speakers, status indicators, light sources, audio jacks and other audio port components, digital data port devices, light sensors, accelerometers or other components that can detect motion and device orientation relative to the Earth, capacitance sensors, proximity sensors (e.g., a capacitive proximity sensor and/or an infrared proximity sensor), magnetic sensors, and other sensors and input-output components.

Input-output circuitry 16 may include wireless communications circuitry 34 for communicating wirelessly with external equipment. Wireless communications circuitry 34 may include radio-frequency (RF) transceiver circuitry formed from one or more integrated circuits, power amplifier circuitry, low-noise input amplifiers, passive RF components, one or more antennas 40, transmission lines, and other circuitry for handling RF wireless signals. Wireless signals can also be sent using light (e.g., using infrared communications).

Wireless communications circuitry 34 may include radio-frequency transceiver circuitry 20 for handling various radio-frequency communications bands. For example, circuitry 34 may include transceiver circuitry 22, 24, 26, and 28.

Transceiver circuitry 24 may be wireless local area network transceiver circuitry. Transceiver circuitry 24 may handle 2.4 GHz and 5 GHz bands for Wi-Fi® (IEEE 802.11) communications or other wireless local area network (WLAN) bands and may handle the 2.4 GHz Bluetooth® communications band or other wireless personal area network (WPAN) bands.

Circuitry 34 may use cellular telephone transceiver circuitry 26 for handling wireless communications in frequency ranges such as a low communications band from 600 to 960 MHz, a midband from 1710 to 2170 MHz, a high band from 2300 to 2700 MHz, an ultra-high band from 3400 to 3700 MHz, or other communications bands between 600 MHz and 4000 MHz or other suitable frequencies (as examples). Circuitry 26 may handle voice data and non-voice data.

Millimeter wave transceiver circuitry 28 (sometimes referred to as extremely high frequency (EHF) transceiver circuitry 28 or transceiver circuitry 28) may support communications at frequencies between about 10 GHz and 300 GHz. For example, transceiver circuitry 28 may support communications in Extremely High Frequency (EHF) or millimeter wave communications bands between about 30

GHz and 300 GHz and/or in centimeter wave communications bands between about 10 GHz and 30 GHz (sometimes referred to as Super High Frequency (SHF) bands). As examples, transceiver circuitry 28 may support communications in an IEEE K communications band between about 18 GHz and 27 GHz, a $K_a$ communications band between about 26.5 GHz and 40 GHz, a $K_u$ communications band between about 12 GHz and 18 GHz, a V communications band between about 40 GHz and 75 GHz, a W communications band between about 75 GHz and 110 GHz, or any other desired frequency band between approximately 10 GHz and 300 GHz. If desired, circuitry 28 may support IEEE 802.11ad communications at 60 GHz and/or 5th generation mobile networks or 5th generation wireless systems (5G) communications bands between 27 GHz and 90 GHz. If desired, circuitry 28 may support communications at multiple frequency bands between 10 GHz and 300 GHz such as a first band from 27.5 GHz to 28.5 GHz, a second band from 37 GHz to 41 GHz, and a third band from 57 GHz to 71 GHz, or other communications bands between 10 GHz and 300 GHz. Circuitry 28 may be formed from one or more integrated circuits (e.g., multiple integrated circuits mounted on a common printed circuit in a system-in-package device, one or more integrated circuits mounted on different substrates, etc.). While circuitry 28 is sometimes referred to herein as millimeter wave transceiver circuitry 28, millimeter wave transceiver circuitry 28 may handle communications at any desired communications bands at frequencies between 10 GHz and 300 GHz (e.g., transceiver circuitry 28 may transmit and receive radio-frequency signals in millimeter wave communications bands, centimeter wave communications bands, etc.).

Wireless communications circuitry 34 may include satellite navigation system circuitry such as Global Positioning System (GPS) receiver circuitry 22 for receiving GPS signals at 1575 MHz or for handling other satellite positioning data (e.g., GLONASS signals at 1609 MHz). Satellite navigation system signals for receiver 22 are received from a constellation of satellites orbiting the earth.

In satellite navigation system links, cellular telephone links, and other long-range links, wireless signals are typically used to convey data over thousands of feet or miles. In Wi-Fi® and Bluetooth® links at 2.4 and 5 GHz and other short-range wireless links, wireless signals are typically used to convey data over tens or hundreds of feet. Extremely high frequency (EHF) wireless transceiver circuitry 28 may convey signals that travel (over short distances) between a transmitter and a receiver over a line-of-sight path. To enhance signal reception for millimeter and centimeter wave communications, phased antenna arrays and beam steering techniques may be used (e.g., schemes in which antenna signal phase and/or magnitude for each antenna in an array is adjusted to perform beam steering). Antenna diversity schemes may also be used to ensure that the antennas that have become blocked or that are otherwise degraded due to the operating environment of device 10 can be switched out of use and higher-performing antennas used in their place.

Wireless communications circuitry 34 can include circuitry for other short-range and long-range wireless links if desired. For example, wireless communications circuitry 34 may include circuitry for receiving television and radio signals, paging system transceivers, near field communications (NFC) circuitry, etc.

Antennas 40 in wireless communications circuitry 34 may be formed using any suitable antenna types. For example, antennas 40 may include antennas with resonating elements that are formed from loop antenna structures, patch antenna structures, stacked patch antenna structures, antenna structures having parasitic elements, inverted-F antenna structures, slot antenna structures, planar inverted-F antenna structures, monopoles, dipoles, helical antenna structures, Yagi (Yagi-Uda) antenna structures, surface integrated waveguide structures, hybrids of these designs, etc. If desired, one or more of antennas 40 may be cavity-backed antennas. Different types of antennas may be used for different bands and combinations of bands. For example, one type of antenna may be used in forming a local wireless link antenna and another type of antenna may be used in forming a remote wireless link antenna. Dedicated antennas may be used for receiving satellite navigation system signals or, if desired, antennas 40 can be configured to receive both satellite navigation system signals and signals for other communications bands (e.g., wireless local area network signals and/or cellular telephone signals). Antennas 40 can be arranged in phased antenna arrays for handling millimeter wave and centimeter wave communications.

As shown in FIG. 1, device 10 may include a housing such as housing 12. Housing 12, which may sometimes be referred to as an enclosure or case, may be formed of plastic, glass, ceramics, fiber composites, metal (e.g., stainless steel, aluminum, metallic coatings on a substrate, etc.), other suitable materials, or a combination of any two or more of these materials. Housing 12 may be formed using a unibody configuration in which some or all of housing 12 is machined or molded as a single structure or may be formed using multiple structures (e.g., an internal frame structure, one or more structures that form exterior housing surfaces, etc.). Antennas 40 may be mounted in housing 12. Dielectric-filled openings such as plastic-filled openings may be formed in metal portions of housing 12 (e.g., to serve as antenna windows and/or to serve as gaps that separate portions of antennas 40 from each other).

In scenarios where input-output devices 18 include a display, the display may be a touch screen display that incorporates a layer of conductive capacitive touch sensor electrodes or other touch sensor components (e.g., resistive touch sensor components, acoustic touch sensor components, force-based touch sensor components, light-based touch sensor components, etc.) or may be a display that is not touch-sensitive. Capacitive touch screen electrodes may be formed from an array of indium tin oxide pads or other transparent conductive structures. The display may include an array of display pixels formed from liquid crystal display (LCD) components, an array of electrophoretic display pixels, an array of plasma display pixels, an array of organic light-emitting diode display pixels, an array of electrowetting display pixels, or display pixels based on other display technologies. The display may be protected using a display cover layer such as a layer of transparent glass, clear plastic, sapphire, or other transparent dielectric. If desired, some of the antennas 40 (e.g., antenna arrays that may implement beam steering, etc.) may be mounted under an inactive border region of the display. The display may contain an active area with an array of pixels (e.g., a central rectangular portion). Inactive areas of the display are free of pixels and may form borders for the active area. If desired, antennas may also operate through dielectric-filled openings elsewhere in device 10.

If desired, housing 12 may include a conductive rear surface. The rear surface of housing 12 may lie in a plane that is parallel to a display of device 10. In configurations for device 10 in which the rear surface of housing 12 is formed from metal, it may be desirable to form parts of peripheral conductive housing structures as integral portions of the housing structures forming the rear surface of housing 12. For example, a rear housing wall of device 10 may be formed from a planar metal structure, and portions of peripheral housing structures on the sides of housing 12 may be formed as vertically extending integral metal portions of the planar metal structure. Housing structures such as these may, if desired, be machined from a block of metal and/or may include multiple metal pieces that are assembled together to form housing 12. The planar rear wall of housing 12 may have one or more, two or more, or three or more portions. The peripheral housing structures and/or the conductive rear wall of housing 12 may form one or more exterior surfaces of device 10 (e.g., surfaces that are visible to a user of device 10) and/or may be implemented using internal structures that do not form exterior surfaces of device 10 (e.g., conductive housing structures that are not visible to a user of device 10 such as conductive structures that are covered with layers such as thin cosmetic layers, protective coatings, and/or other coating layers that may include dielectric materials such as glass, ceramic, plastic, or other structures that form the exterior surfaces of device 10 and/or serve to hide internal structures from view of the user).

Transmission line paths may be used to route antenna signals within device 10. For example, transmission line paths may be used to couple antennas 40 to transceiver circuitry 20. Transmission line paths in device 10 may include coaxial cable paths, microstrip transmission lines, stripline transmission lines, edge-coupled microstrip transmission lines, edge-coupled stripline transmission lines, waveguide structures for conveying signals at millimeter wave frequencies (e.g., coplanar waveguides or grounded coplanar waveguides), transmission lines formed from combinations of transmission lines of these types, etc.

Transmission line paths in device 10 may be integrated into rigid and/or flexible printed circuit boards if desired. In one suitable arrangement, transmission line paths in device 10 may include transmission line conductors (e.g., signal and/or ground conductors) that are integrated within multilayer laminated structures (e.g., layers of a conductive material such as copper and a dielectric material such as a resin that are laminated together without intervening adhesive) that may be folded or bent in multiple dimensions (e.g., two or three dimensions) and that maintain a bent or folded shape after bending (e.g., the multilayer laminated structures may be folded into a particular three-dimensional shape to route around other device components and may be rigid enough to hold its shape after folding without being held in place by stiffeners or other structures). All of the multiple layers of the laminated structures may be batch laminated together (e.g., in a single pressing process) without adhesive (e.g., as opposed to performing multiple pressing processes to laminate multiple layers together with adhesive). Filter circuitry, switching circuitry, impedance matching circuitry, and other circuitry may be interposed within the transmission lines, if desired.

Device 10 may contain multiple antennas 40. The antennas may be used together or one of the antennas may be switched into use while other antenna(s) are switched out of use. If desired, control circuitry 14 may be used to select an optimum antenna to use in device 10 in real time and/or to select an optimum setting for adjustable wireless circuitry associated with one or more of antennas 40. Antenna adjustments may be made to tune antennas to perform in desired frequency ranges, to perform beam steering with a phased antenna array, and to otherwise optimize antenna performance. Sensors may be incorporated into antennas 40 to gather sensor data in real time that is used in adjusting antennas 40 if desired.

In some configurations, antennas 40 may include antenna arrays (e.g., phased antenna arrays to implement beam steering functions). For example, the antennas that are used in handling millimeter wave signals for extremely high frequency wireless transceiver circuits 28 may be implemented as phased antenna arrays. The radiating elements in a phased antenna array for supporting millimeter wave communications may be patch antennas, dipole antennas, Yagi (Yagi-Uda) antennas, or other suitable antenna elements. Transceiver circuitry 28 can be integrated with the phased antenna arrays to form integrated phased antenna array and transceiver circuit modules or packages (sometimes referred to herein as integrated antenna modules or antenna modules) if desired.

In devices such as handheld devices, the presence of an external object such as the hand of a user or a table or other surface on which a device is resting has a potential to block wireless signals such as millimeter wave signals. In addition, millimeter wave communications typically require a line of sight between antennas 40 and the antennas on an external device. Accordingly, it may be desirable to incorporate multiple phased antenna arrays into device 10, each of which is placed in a different location within or on device 10. With this type of arrangement, an unblocked phased antenna array may be switched into use and, once switched into use, the phased antenna array may use beam steering to optimize wireless performance. Similarly, if a phased antenna array does not face or have a line of sight to an external device, another phased antenna array that has line of sight to the external device may be switched into use and that phased antenna array may use beam steering to optimize wireless performance. Configurations in which antennas from one or more different locations in device 10 are operated together may also be used (e.g., to form a phased antenna array, etc.).

Figure 2:
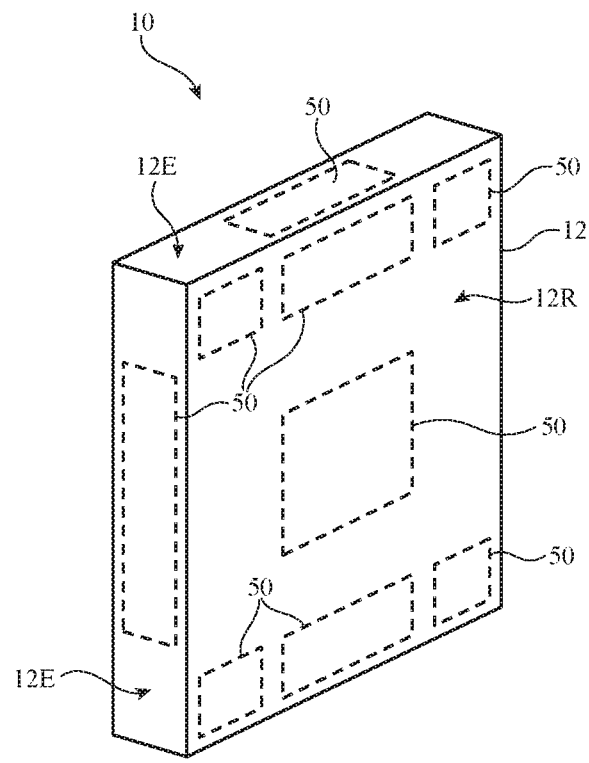
FIGS. 2 and 3 are perspective views of an illustrative electronic device showing locations at which phased antenna arrays for millimeter wave communications may be located in accordance with an embodiment.

FIG. 2 is a perspective view of electronic device 10 showing illustrative locations 50 at which antennas 40 (e.g., single antennas and/or phased antenna arrays for use with wireless circuitry 34 such as millimeter wave wireless transceiver circuitry 28 in FIG. 1) may be mounted in device 10. As shown in FIG. 2, housing 12 of device 10 may include rear housing wall 12R (sometimes referred to as wall 12R, rear housing portion 12R, or rear housing surface 12R) and housing sidewalls 12E. In one suitable arrangement, a display may be mounted to the side of housing 12 opposing rear housing wall 12R.

Antennas 40 (e.g., single antennas 40 or arrays of antennas 40) may be mounted at locations 50 at the corners of device 10, along the edges of housing 12 such as on sidewalls 12E, on the upper and lower portions of rear housing wall 12R, in the center of rear housing 12 (e.g., under a dielectric window structure such as a plastic logo), etc. In configurations in which housing 12 is formed from a dielectric, antennas 40 may transmit and receive antenna signals through the dielectric, may be formed from conductive structures patterned directly onto the dielectric, or may be formed on dielectric substrates (e.g., flexible printed circuit board substrates) formed on the dielectric. In configurations in which housing 12 is formed from a conductive material such as metal, slots or other openings may be formed in the metal that are filled with plastic or other dielectric. Antennas 40 may be mounted in alignment with the dielectric (i.e., the dielectric in housing 12 may serve as one or more antenna windows for antennas 40) or may be formed on dielectric substrates (e.g., flexible printed circuit board substrates) mounted to external surfaces of housing 12.

Figure 3:
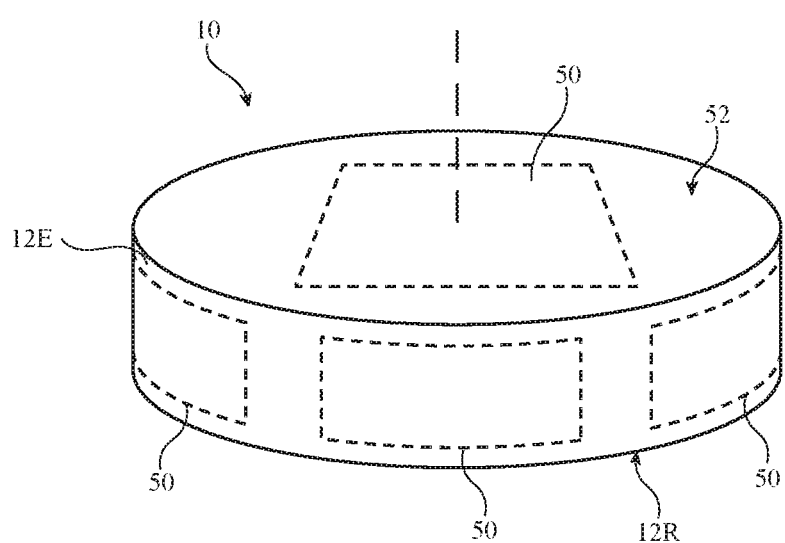

In the example of FIG. 2, rear housing wall 12R has a rectangular periphery. Housing sidewalls 12E surround the rectangular periphery of rear housing wall 12R and extend from rear housing wall 12R to the opposing face of device 10. In another suitable arrangement, device 10 and housing 12 may have a cylindrical shape. As shown in FIG. 3, rear housing wall 12R has a circular or elliptical periphery. Rear housing wall 12R may oppose surface 52 of device 10. Surface 52 may be formed from a portion of housing 12, may be formed from a display or transparent display cover layer, or may be formed using any other desired device structures. Housing sidewall 12E may extend between surface 52 and rear housing wall 12R. Antennas 40 may be mounted at locations 50 along housing sidewall 12E, on surface 52, and/or on rear housing wall 12R. By forming phased antenna arrays at different locations along housing sidewall 12E, on surface 52 (sometimes referred to herein as housing surface 52), and/or on rear housing wall 12R (e.g., as shown in FIGS. 2 and 3), the different phased antenna arrays on device 10 may collectively provide line of sight coverage to any point on a sphere surrounding device 10 (or on a hemisphere surrounding device 10 in scenarios where phased antenna arrays are only formed on one side of device 10).

The examples of FIGS. 2 and 3 are merely illustrative. In general, housing 12 and device 10 may have any desired shape or form factor. For example, rear housing wall 12R may have a triangular periphery, hexagonal periphery, polygonal periphery, a curved periphery, combinations of these, etc. Housing sidewall 12E may include straight portions, curved portions, stepped portions, combinations of these, etc. If desired, housing 12 may include other portions having any other desired shapes. The height of housing sidewall 12E may be less than, equal to, or greater than the length and/or width of rear housing wall 12R.

Figure 4:
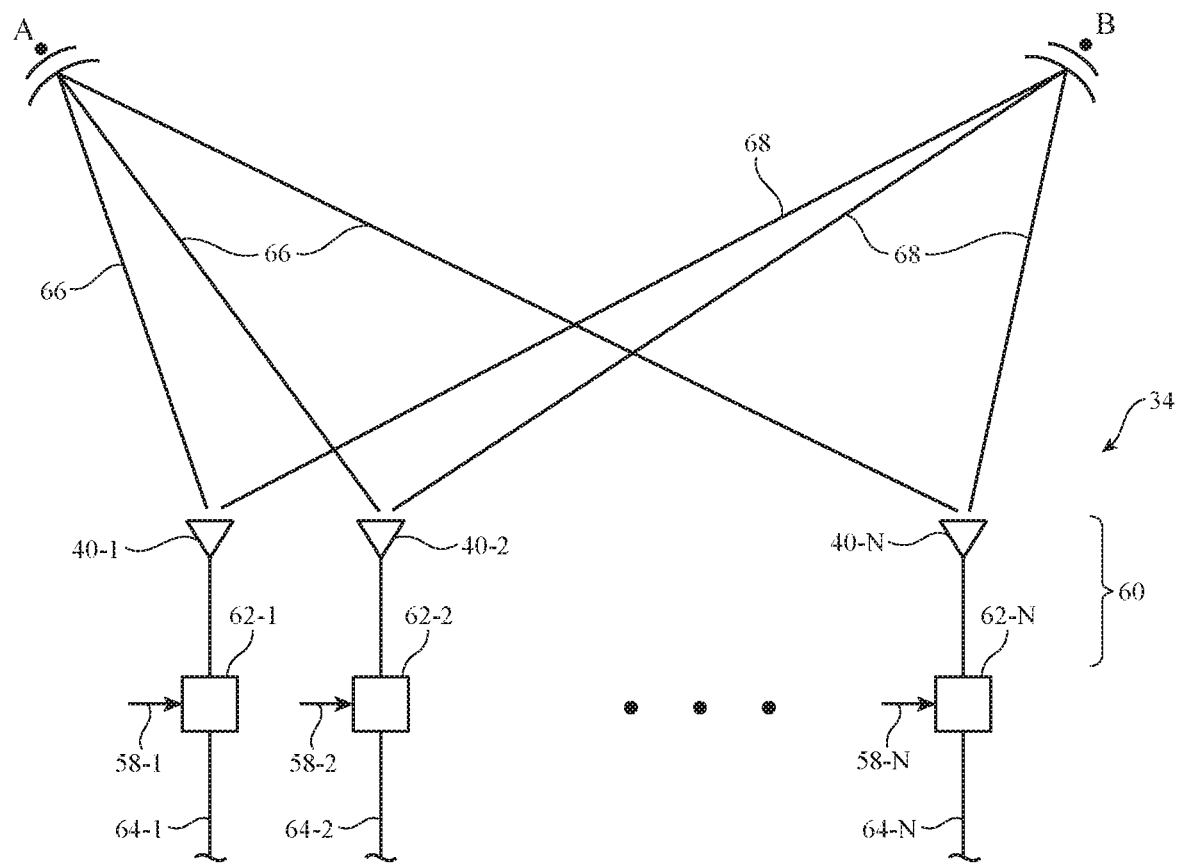
FIG. 4 is a diagram of an illustrative phased antenna array that may be adjusted using control circuitry to direct a beam of signals in accordance with an embodiment.

FIG. 4 shows how antennas 40 on device 10 may be formed in a phased antenna array. As shown in FIG. 4, phased antenna array 60 (sometimes referred to herein as array 60, antenna array 60, or array 60 of antennas 40) may be coupled to signal paths such as transmission line paths 64 (e.g., one or more radio-frequency transmission lines). For example, a first antenna 40-1 in phased antenna array 60 may be coupled to a first transmission line path 64-1, a second antenna 40-2 in phased antenna array 60 may be coupled to a second transmission line path 64-2, an Nth antenna 40-N in phased antenna array 60 may be coupled to an Nth transmission line path 64-N, etc. While antennas 40 are described herein as forming a phased antenna array, the antennas 40 in phased antenna array 60 may sometimes be referred to as collectively forming a single phased array antenna.

Antennas 40 in phased antenna array 60 may be arranged in any desired number of rows and columns or in any other desired pattern (e.g., the antennas need not be arranged in a grid pattern having rows and columns). During signal transmission operations, transmission line paths 64 may be used to supply signals (e.g., radio-frequency signals such as millimeter wave and/or centimeter wave signals) from transceiver circuitry 28 (FIG. 1) to phased antenna array 60 for wireless transmission to external wireless equipment. During signal reception operations, transmission line paths 64 may be used to convey signals received at phased antenna array 60 from external equipment to transceiver circuitry 28 (FIG. 1).

The use of multiple antennas 40 in phased antenna array 60 allows beam steering arrangements to be implemented by controlling the relative phases and magnitudes (amplitudes) of the radio-frequency signals conveyed by the antennas. In the example of FIG. 4, antennas 40 each have a corresponding radio-frequency phase and magnitude controller 62 (e.g., a first phase and magnitude controller 62-1 interposed on transmission line path 64-1 may control phase and magnitude for radio-frequency signals handled by antenna 40-1, a second phase and magnitude controller 62-2 interposed on transmission line path 64-2 may control phase and magnitude for radio-frequency signals handled by antenna 40-2, an Nth phase and magnitude controller 62-N interposed on transmission line path 64-N may control phase and magnitude for radio-frequency signals handled by antenna 40-N, etc.).

Phase and magnitude controllers 62 may each include circuitry for adjusting the phase of the radio-frequency signals on transmission line paths 64 (e.g., phase shifter circuits) and/or circuitry for adjusting the magnitude of the radio-frequency signals on transmission line paths 64 (e.g., power amplifier and/or low noise amplifier circuits). Phase and magnitude controllers 62 may sometimes be referred to collectively herein as beam steering circuitry (e.g., beam steering circuitry that steers the beam of radio-frequency signals transmitted and/or received by phased antenna array 60).

Phase and magnitude controllers 62 may adjust the relative phases and/or magnitudes of the transmitted signals that are provided to each of the antennas in phased antenna array 60 and may adjust the relative phases and/or magnitudes of the received signals that are received by phased antenna array 60 from external equipment. Phase and magnitude controllers 62 may, if desired, include phase detection circuitry for detecting the phases of the received signals that are received by phased antenna array 60 from external equipment. The term "beam" or "signal beam" may be used herein to collectively refer to wireless signals that are transmitted and received by phased antenna array 60 in a particular direction. The term "transmit beam" may sometimes be used herein to refer to wireless radio-frequency signals that are transmitted in a particular direction whereas the term "receive beam" may sometimes be used herein to refer to wireless radio-frequency signals that are received from a particular direction.

If, for example, phase and magnitude controllers 62 are adjusted to produce a first set of phases and/or magnitudes for transmitted millimeter wave signals, the transmitted signals will form a millimeter wave frequency transmit beam as shown by beam 66 of FIG. 4 that is oriented in the direction of point A. If, however, phase and magnitude controllers 62 are adjusted to produce a second set of phases and/or magnitudes for the transmitted millimeter wave signals, the transmitted signals will form a millimeter wave frequency transmit beam as shown by beam 68 that is oriented in the direction of point B. Similarly, if phase and magnitude controllers 62 are adjusted to produce the first set of phases and/or magnitudes, wireless signals (e.g., millimeter wave signals in a millimeter wave frequency receive beam) may be received from the direction of point A as shown by beam 66. If phase and magnitude controllers 62 are adjusted to produce the second set of phases and/or magnitudes, signals may be received from the direction of point B, as shown by beam 68.

Each phase and magnitude controller 62 may be controlled to produce a desired phase and/or magnitude based on a corresponding control signal 58 received from control circuitry 14 of FIG. 1 or other control circuitry in device 10 (e.g., the phase and/or magnitude provided by phase and magnitude controller 62-1 may be controlled using control signal 58-1, the phase and/or magnitude provided by phase and magnitude controller 62-2 may be controlled using control signal 58-2, etc.). If desired, control circuitry 14 may actively adjust control signals 58 in real time to steer the transmit or receive beam in different desired directions over time. Phase and magnitude controllers 62 may provide information identifying the phase of received signals to control circuitry 14 if desired.

When performing millimeter or centimeter wave communications, radio-frequency signals are conveyed over a line of sight path between phased antenna array 60 and external equipment. If the external equipment is located at location A of FIG. 4, phase and magnitude controllers 62 may be adjusted to steer the signal beam towards direction A. If the external equipment is located at location B, phase and magnitude controllers 62 may be adjusted to steer the signal beam towards direction B. In the example of FIG. 4, beam steering is shown as being performed over a single degree of freedom for the sake of simplicity (e.g., towards the left and right on the page of FIG. 4). However, in practice, the beam is steered over two or more degrees of freedom (e.g., in three dimensions, into and out of the page and to the left and right on the page of FIG. 4).

Figure 5:
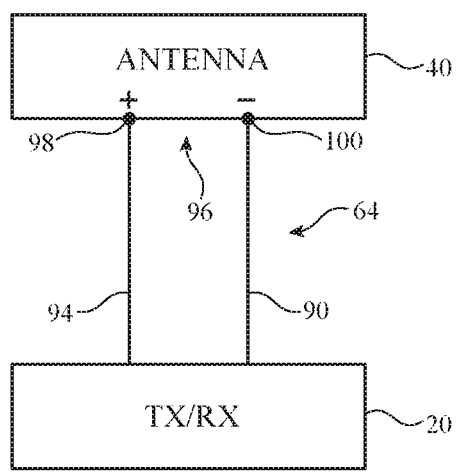
FIG. 5 is a schematic diagram of illustrative wireless communications circuitry in accordance with an embodiment.

A schematic diagram of an antenna 40 that may be formed in phased antenna array 60 (e.g., as antenna 40-1, 40-2, 40-3, and/or 40-N in phased antenna array 60 of FIG. 4) is shown in FIG. 5. As shown in FIG. 5, antenna 40 may be coupled to transceiver circuitry 20 (e.g., millimeter wave transceiver circuitry 28 of FIG. 1). Transceiver circuitry 20 may be coupled to antenna feed 96 of antenna 40 using transmission line path 64 (sometimes referred to herein as radio-frequency transmission line 64). Antenna feed 96 may include a positive antenna feed terminal such as positive antenna feed terminal 98 and may include a ground antenna feed terminal such as ground antenna feed terminal 100. Transmission line path 64 may include a positive signal conductor such as signal conductor 94 that is coupled to terminal 98 and a ground conductor such as ground conductor 90 that is coupled to terminal 100.

Any desired antenna structures may be used for implementing antenna 40. In one suitable arrangement that is sometimes described herein as an example, patch antenna structures may be used for implementing antenna 40. Antennas 40 that are implemented using patch antenna structures may sometimes be referred to herein as patch antennas. An illustrative patch antenna that may be used in phased antenna array 60 of FIG. 4 is shown in FIG. 6.

Figure 6:
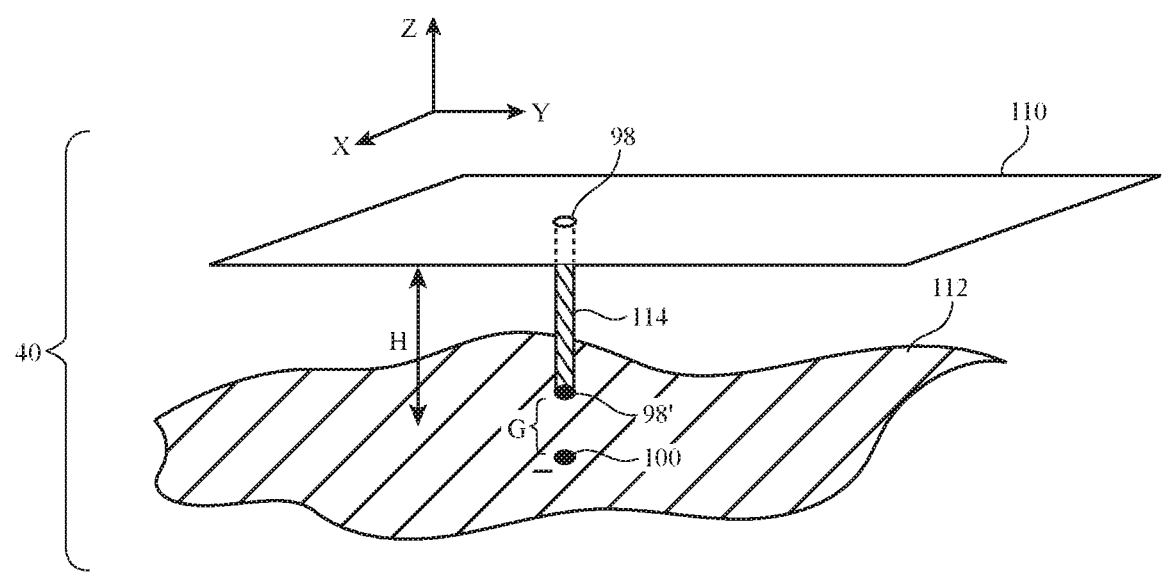
FIG. 6 is a perspective view of an illustrative patch antenna in accordance with an embodiment.

As shown in FIG. 6, antenna 40 may have a patch antenna resonating element such as patch element 110 that is separated from a ground plane structure such as ground 112 (sometimes referred to as ground layer 112, grounding layer 112, or antenna ground 112). Patch element 110 and ground 112 may be formed from metal foil, machined metal structures, metal traces on a printed circuit or a molded plastic carrier, electronic device housing structures, or other conductive structures in an electronic device such as device 10. Patch element 110 may sometimes be referred to herein as patch 110, patch antenna resonating element 110, patch radiating element 110, or antenna resonating element 110.

Patch element 110 may lie within a plane such as the X-Y plane of FIG. 5. Ground 112 may lie within a plane that is parallel to the plane of patch element 110. Patch element 110 and ground 112 may therefore lie in separate parallel planes that are separated by a distance H. In general, greater distances (heights) H may allow antenna 40 to exhibit a greater bandwidth than shorter distances H. However, greater distances H may consume more volume within device 10 (where space is often at a premium) than shorter distances H.

Conductive path 114 may be used to couple terminal 98' to positive antenna feed terminal 98. Antenna 40 may be fed using a transmission line with a positive conductor coupled to terminal 98' (and thus to positive antenna feed terminal 98) and with a ground conductor coupled to ground antenna feed terminal 100. Other feeding arrangements may be used if desired. Moreover, patch element 110 and ground 112 may have different shapes and orientations (e.g., planar shapes, curved patch shapes, patch element shapes with non-rectangular outlines, shapes with straight edges such as squares, shapes with curved edges such as ovals and circles, shapes with combinations of curved and straight edges, etc.).

Figure 7:
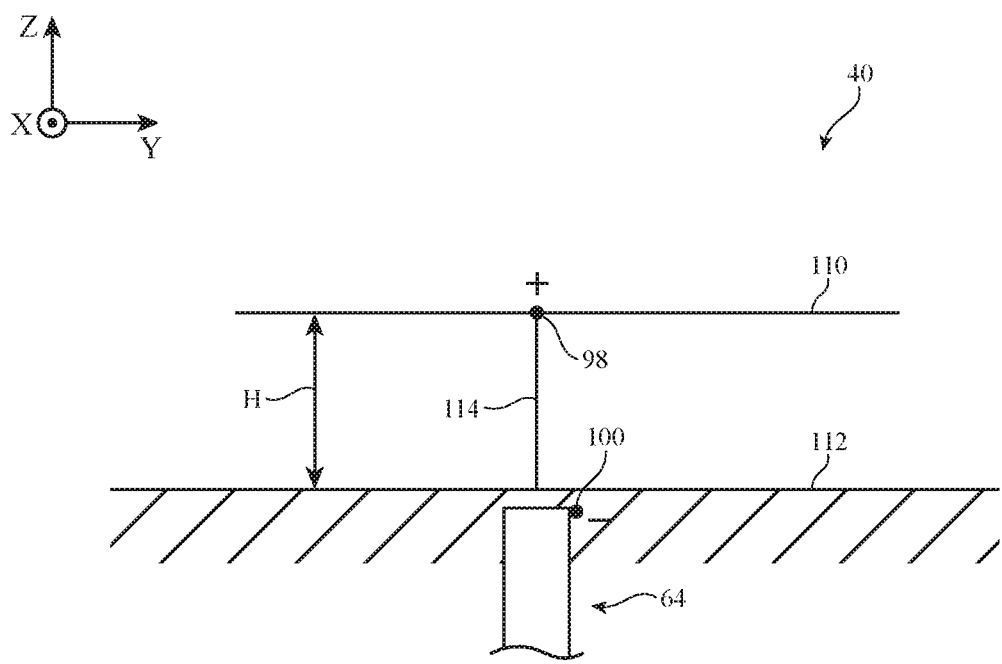
FIG. 7 is a side view of an illustrative patch antenna in accordance with an embodiment.

A side view of a patch antenna such as antenna 40 of FIG. 6 is shown in FIG. 7. As shown in FIG. 7, antenna 40 may be fed using an antenna feed (with antenna feed terminals 98 and 100) that is coupled to a transmission line such as transmission line 64. Patch element 110 of antenna 40 may lie in a plane parallel to the X-Y plane of FIG. 7 and the surface of the structures that form ground (e.g., ground 112) may lie in a plane that is separated by vertical distance H from the plane of patch element 110.

With the illustrative feeding arrangement of FIG. 7, a ground conductor of transmission line 64 (e.g., ground conductor 90 of FIG. 5) is coupled to ground antenna feed terminal 100 on ground 112 and a positive conductor of transmission line 64 (e.g., signal conductor 94 of FIG. 5) is coupled to positive antenna feed terminal 98 via an opening in ground 112 and conductive path 114 (which may be an extended portion of the transmission line's positive conductor). Conductive path 114 may be implemented using conductive pins, solder, welds, conductive wires, conductive springs, conductive through-vias, and/or any other desired conductive structures. Other feeding arrangements may be used if desired (e.g., feeding arrangements in which a microstrip transmission line in a printed circuit or other transmission line that lies in a plane parallel to the X-Y plane is coupled to terminals 98 and 100, etc.). To enhance the frequency coverage and polarizations handled by antenna 40, antenna 40 may be provided with multiple feeds (e.g., two feeds) if desired. These examples are merely illustrative and, in general, the patch element may have any desired shape. Other types of antennas may be used if desired.

Antennas of the types shown in FIGS. 6 and 7 and/or other types of antennas such as dipole antennas and Yagi antennas may be arranged in a phased antenna array such as phased antenna array 60 (FIG. 4). If desired, phased antenna array 60 may be integrated with other circuitry such as transceiver circuitry 20 to form an integrated antenna module.

Figure 8:
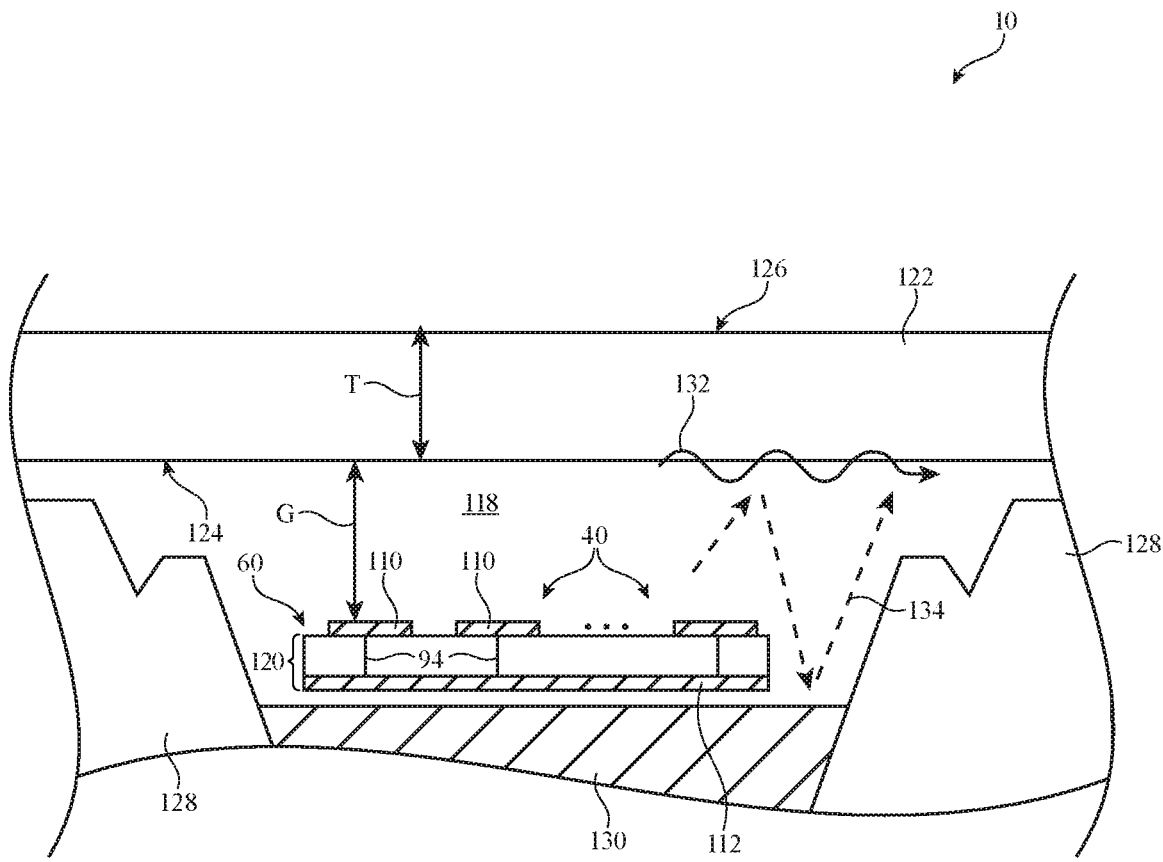
FIG. 8 is a cross-sectional side view of an illustrative antenna module mounted behind a dielectric cover layer in accordance with an embodiment.

FIG. 8 is a cross-sectional side view of an illustrative phased antenna array 60 formed from a pattern of patch antennas (e.g., antennas 40 of the types shown in FIGS. 6 and 7). As shown in FIG. 8, multiple antennas 40 may be arranged in phased antenna array 60. Patch elements 110 of antennas 40 in phased antenna array 60 may be formed over ground 112 at different locations across the lateral surface of substrate 120 (e.g., across the X-Y plane of FIG. 8).

The example of FIG. 8 is merely illustrative. In general, any desired number of antennas 40 may be formed in phased antenna array 60 and may be arranged in any desired manner. Other components such as transceiver circuitry may also be mounted to substrate 120 to form an integrated antenna module if desired. Patch elements 110 may be replaced with any desired antenna resonating elements such as dipole antenna resonating elements, Yagi antenna resonating elements, etc.

Substrate 120 may be, for example, a rigid or printed circuit board or other dielectric substrate. Substrate 120 may be a stacked dielectric substrate that includes multiple stacked dielectric layers (e.g., multiple layers of printed circuit board substrate such as multiple layers of fiberglass-filled epoxy, rigid printed circuit board material, flexible printed circuit board material, ceramic, plastic, glass, or other dielectrics). Patch elements 110, ground 112, and/or other components such as parasitic elements in phased antenna array 60 may be interposed between or formed on the dielectric layers of substrate 120.

Conductive traces or other metal layers on or embedded within substrate 120 may be used in forming transmission line structures such as transmission line paths 64 of FIGS. 4, 5, and 7. Conductive traces for forming transmission line paths 64 may be interposed between the dielectric layers of substrate 120. For example, conductive traces used in forming transmission line paths 64 may be embedded within a set of dielectric layers in substrate 120 (sometimes referred to herein as transmission line layers) located below ground 112 (not shown in FIG. 8 for the sake of clarity). Respective transmission line signal conductors 94 from transmission line paths 64 may each couple a corresponding patch element 110 to transceiver circuitry 28 (FIG. 1). Transmission line ground conductors (e.g., ground conductors 90 of FIG. 5) may couple transceiver circuitry 28 to ground 112 for each antenna 40 in phased antenna array 60 (e.g., ground 112 may be shared between antennas 40 in phased antenna array 60).

In order to protect phased antenna array 60 from damage, dust, water, and other contaminants and for the purposes of mechanical reliability of the antenna assembly, a dielectric cover layer such as dielectric cover layer 122 may be formed over phased antenna array 60. Dielectric cover layer 122 may sometimes be referred to herein as cover layer 122, dielectric cover 122, dielectric layer 122, or radome 122. Dielectric cover layer 122 may, for example, be formed from a dielectric portion of housing 12 of device 10 such that exterior surface 126 of dielectric cover layer 122 forms an exterior surface of device 10 (e.g., within regions 50 of FIGS. 2 and 3). Dielectric cover layer 122 may be formed from a dielectric housing wall of electronic device 10 or from a dielectric antenna window within a conductive housing wall of electronic device 10. In another suitable arrangement, dielectric cover layer 122 may form a display cover layer for a display of electronic device 10 (e.g., a display cover layer through which the display emits light and/or receives a touch input from a user and that may extend across some or all of the lateral face of device 10). If desired, a conductive layer such as a conductive housing wall for device 10 may be attached to interior surface 124 of dielectric cover layer 122.

Other components such as components 128 may be mounted within the interior of electronic device 10 (e.g., adjacent to or surrounding phased antenna array 60). Components such as components 128 and other components within device 10 (e.g., components beneath phased antenna array 60 of FIG. 8) may be sensitive to interference from radio-frequency signals conveyed by phased antenna array 60. Similarly, these components may also generate electromagnetic signals that interfere with the operation of phased antenna array 60. If desired, a conductive shielding layer such as shield layer 130 may isolate phased antenna array 60 from electronic components within device 10 and beneath phased antenna array 60 (and vice versa).

The dielectric properties and the geometry of dielectric cover layer 122 may affect the radiation characteristics of phased antenna array 60. As shown in FIG. 8, dielectric cover layer 122 may be separated from patch elements 110 of phased antenna array 60 by a gap such as gap 118 (e.g., patch elements 110 may be located at a distance G from interior surface 124 of dielectric cover layer 122). Gap 118 may be filled with a dielectric material such as plastic, foam, air, etc. Dielectric cover layer 122 may be formed from any desired dielectric materials. As examples, dielectric cover layer 122 may be formed from plastic, glass, ceramic, fiber composites, polymer, a combination of two or more of these materials, or any other suitable materials.

In the example of FIG. 7, dielectric cover layer 122 has a uniform thickness T across the lateral area of phased antenna array 60. Thickness T may be defined by interior surface 124 and exterior surface 126. Interior surface 124 may sometimes be referred to herein as internal surface 124, inner surface 124, or lower surface 124. Exterior surface 126 may sometimes be referred to herein as external surface 126, outer surface 126, or upper surface 126.

Surfaces 124 and 126 may lie in parallel planes with respect to a surface of patch elements 110, a surface of substrate 120, and/or a surface of ground 112. In another suitable example, interior surface 124 and/or exterior surface 126 may be curved to minimize destructive interference between radio-frequency signals that are transmitted by phased antenna array 60 and reflected versions of the transmitted signals that are reflected at surfaces 124 and/or 126 (e.g., due differences in the dielectric constants of gap 118, dielectric cover layer 122, and the exterior of device 10). Surfaces 124 and/or 126 may be continuously curved across the lateral area of phased antenna array 60 or may include local cavities (curves) each located over a respective antenna 40 in phased antenna array 60. Distance G of gap 118, thickness T of dielectric cover layer 122, and/or the dielectric materials used to form dielectric cover layer 122 and gap 118 may be selected to further minimize destructive interference effects (e.g., based on the wavelength of operation of phased antenna array 60). As one example, thickness T of dielectric cover layer 122 may be approximately equal to half of the effective wavelength of operation of phased antenna array 60 (e.g., half of the free space wavelength of operation modified by the dielectric constant of dielectric cover layer 122).

Radio-frequency signals transmitted by phased antenna array 60 may reflect off of interior surface 124 towards conductive shield layer 130. Conductive shield layer 130 reflects this light back towards dielectric cover layer 122, as shown by arrows 134 of FIG. 8. If care is not taken, the radio-frequency signals that reflect off of conductive shield layer 130 may destructively interfere with radio-frequency signals transmitted by phased antenna array 60 over some transmit angles. This destructive interference may reduce the gain of phased antenna array 60 over these transmit angles, leading antenna 40 to exhibit an undesirably non-uniform radiation pattern across the hemisphere above phased antenna array 60.

While the presence of conductive shield layer 130 may isolate phased antenna array 60 from internal components below conductive shield layer 130, components 128 located towards the sides of phased antenna array 60 may still interfere with or be affected by radio-frequency signals conveyed by phased antenna array 60. Radio-frequency signals handled by phased antenna array 60 (e.g., millimeter and centimeter wave signals) may also generate surface waves such as surface waves 132 at interior surface 124 of dielectric cover layer 122. If care is not taken, low angle signals conveyed by phased antenna array 60 and surface waves 132 may interfere with adjacent components 128 within device 10 and may escape out of the sides of device 10, where the signals may undesirably interfere with external equipment and/or may be undesirably absorbed by a user's body. Operating at relatively high frequencies such as centimeter and millimeter wave frequencies may also generate an excessive amount of heat within gap 118.

Figure 9:
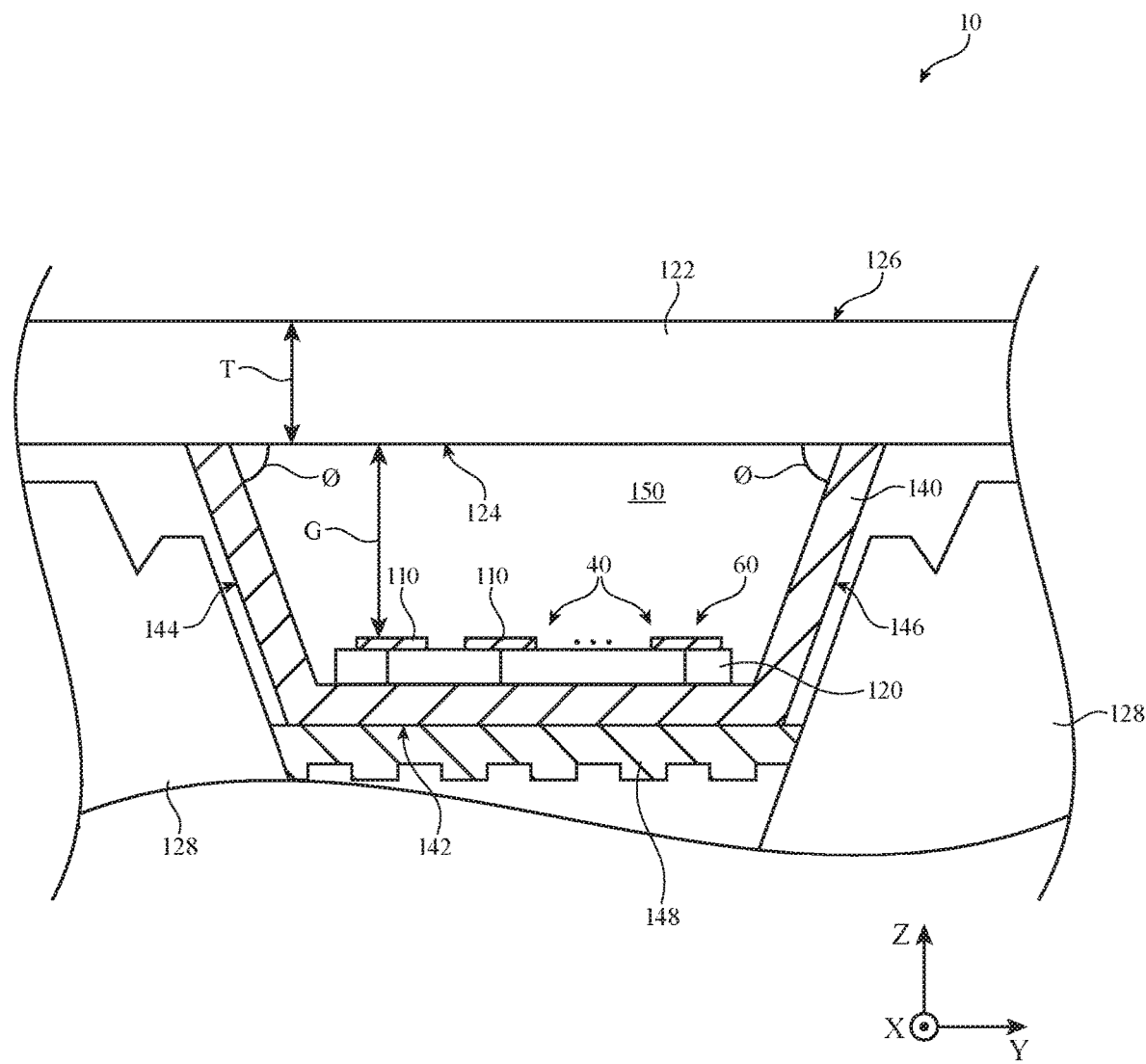
FIG. 9 is a cross-sectional side view of an illustrative antenna module mounted within a conductive shielding pocket behind a dielectric cover layer in accordance with an embodiment.

In order to mitigate these issues, phased antenna array 60 may be mounted within a conductive pocket below dielectric cover layer 122. FIG. 9 is a cross-sectional side view showing how phased antenna array 60 may be mounted within a conductive pocket below dielectric cover layer 122.

As shown in FIG. 9, device 10 may include a conductive pocket 140 below dielectric cover layer 122. Conductive pocket 140 (sometimes referred to herein as conductive cavity 140 or conductive bucket 140) may include a conductive rear wall 142 and conductive sidewalls such as walls 144 and 146 that extend from conductive rear wall 142 towards dielectric cover layer 122.

Phased antenna array 60 may be mounted to conductive rear wall 142. While FIG. 9 shows a cross-section of conductive pocket 140, conductive sidewalls such as sidewalls 144 and 146 may extend around all sides of cavity (volume) 150 (e.g., to surround the lateral periphery of phased antenna array 60). In this way, conductive pocket 140 and dielectric cover layer 122 may completely enclose or encapsulate phased antenna array 60 within cavity 150 (e.g., the edges of cavity 150 may be defined by conductive pocket 140 and dielectric cover layer 122).

Conductive rear wall 142 of conductive pocket 140 may be positioned so that patch elements 110 in phased antenna array 60 are separated from interior surface 124 of dielectric cover layer 122 by distance G. Ground 112 for antennas 40 in phased antenna array 60 may be formed from conductive traces embedded within substrate 120 and/or from conductive pocket 140 (not shown in FIG. 9 for the sake of clarity). Conductive rear wall 142 may be shorted to ground traces in substrate 120 and may be held at a ground potential if desired. Phased antenna array 60 may be mounted to conductive rear wall 142 using adhesive, screws, pins, welds, solder, clips, or any other desired fastening structures. If desired, additional substrates may be interposed between substrate 120 and conductive rear housing wall 142. Conductive rear wall 142 may include holes for conveying transmission line structures for phased antenna array 60 between the interior and exterior of conductive pocket 140.

Conductive pocket 140 may be affixed, attached, or connected to dielectric cover layer 122. For example, conductive pocket 140 may be in direct contact with interior surface 124 of dielectric cover layer 122 (e.g., conductive pocket 140 may be secured to dielectric cover layer 122 using screws, pins, clips, or other fastening structures) or may be secured to dielectric cover layer 122 using adhesive (e.g., a layer of conductive and/or dielectric adhesive interposed between the top surface of sidewalls 144 and 146 and interior surface 124 of dielectric cover layer 122). In another suitable arrangement, conductive pocket 140 may be unattached to dielectric cover layer 122. For example, conductive pocket 140 may be pressed against interior surface 124 of dielectric cover layer 122 using biasing structures (e.g., springs, foam, clips, magnets, etc.) or may be separated from interior surface 124 by a gap.

In one suitable arrangement, conductive sidewalls 144 and 146 may extend at a vertical angle between conductive rear wall 142 and dielectric cover layer 122. In another suitable arrangement, conductive sidewalls 144 and 146 may extend at an angle of elevation or angle of inclination Ø with respect to interior surface 124. In the example of FIG. 9, conductive sidewalls 144 and 146 both extend at the same angle Ø with respect to interior surface 124. This is merely illustrative and, if desired, conductive sidewalls 144 and 146 may each extend at different angles with respect to interior surface 124.

Conductive pocket 140 may serve to block radio-frequency signals conveyed by phased antenna array 60 from escaping cavity 150 towards the interior of device 10. Similarly, conductive pocket 140 may serve to block other electromagnetic signals from interfering with the operation of phased antenna array 60. Surface waves at interior surface 124 (e.g., surface waves 132 of FIG. 8) may be blocked from propagating beyond cavity 150 by sidewalls 144 and 146. This may prevent the surface waves from escaping out of the side of the device and being absorbed by a user and/or interfering with external equipment, for example.

Angle Ø may be selected to accommodate the radiation pattern of phased antenna array 60 (e.g., between 10 degrees and 30 degrees, between 15 degrees and 45 degrees, between 30 degrees and 60 degrees, or any other desired angle between about 80 degrees and 10 degrees). For example, in scenarios where phased antenna array 60 is capable of beam steering to relatively low angles above the lateral surface of phased antenna array 60, angle Ø may be relatively small. Similarly, in scenarios where phased antenna array 60 is only capable of beam steering to relatively large angles above the lateral surface of phased antenna array 60, angle Ø may be relatively large. In this way, conductive pocket 140 may serve to isolate phased antenna array 60 from components 128 and the components below phased antenna array 60 and may serve to mitigate surface wave propagation out the sides of device 10 without blocking or limiting the radiation pattern of phased antenna array 60.

If desired, cavity 150 may be non-resonant and may not have cavity modes that are excited by antennas 40 in phased antenna array 60 (e.g., in contrast to cavity antennas having resonant cavity modes excited by a probe within a cavity). For example, the dimensions of conductive pocket 140 may be selected so that cavity 150 is not resonant (non-resonant) at the frequency of operation of phased antenna array 60 (e.g., where the dimensions of cavity 150 are selected so that nodes of the electromagnetic waves within cavity 150 do not align with the conductive walls of conductive pocket 140).

In order to dissipate heat associated with performing wireless communications at millimeter and centimeter wave frequencies (e.g., heat generated by phased antenna array 60, components on the transmission lines coupled to phased antenna array 60, and/or transceiver circuitry 28 of FIG. 1), a heat spreader structure such as heat spreader 148 may be coupled to rear housing wall 142 of conductive pocket 140. Heat spreader 148 may include metal or other materials having a relatively high thermal conductivity. Heat spreader 148 and may serve as a heat sink for the heat generated by phased antenna array 60 (and may therefore sometimes be referred to herein as heat sink 148) or may serve to convey or dissipate heat from cavity 150 and conductive pocket 140 to other portions of device 10 (e.g., portions of device 10 far from transceiver 28 of FIG. 1 and phased antenna array 60).

Heat spreader 148 may, for example, include fin structures to maximize the surface area of heat spreader 148 that is exposed to air (e.g., to maximize cooling rates for phased antenna array 60) or may include any other desired heat spreading structures. If desired, heat spreader 148 may be coupled to rear wall 142 using adhesive, thermal paste, screws, pins, and/or any other desired interconnecting structures. Heat spreader 148 serve as part of the ground for antennas 40 if desired. The example of FIG. 9 is merely illustrative. In general, heat spreader 148 may have any desired shape or configuration, may be coupled to conductive sidewall 144, may be coupled to conductive sidewall 146, etc. Heat spreader 148 may be omitted if desired.

Figure 10:
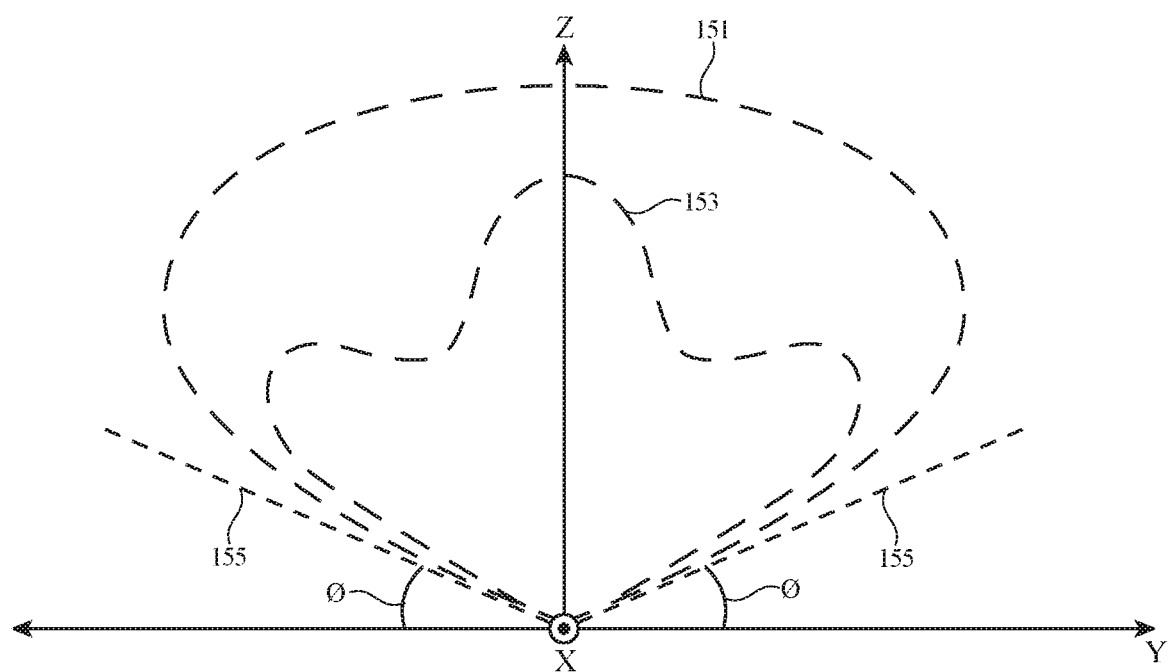
FIG. 10 is a diagram of illustrative antenna radiation patterns associated with antenna modules of the types shown in FIGS. 8 and 9 in accordance with an embodiment.

FIG. 10 shows a cross-sectional side view of illustrative radiation patterns (e.g., radiation pattern envelopes) of phased antenna array 60. As shown in FIG. 10, curve 153 illustrates a radiation pattern envelope of phased antenna array 60 without conductive pocket 140 (e.g., as shown in FIG. 8). As shown by curve 153, the radiation pattern envelope for antenna array 60 may exhibit local minima (troughs) and maxima (peaks) at different angles above the X-Y plane. The minima in curve 153 may, for example, be generated by destructive interference at some angles (e.g., destructive interference due to radio-frequency signals 134 of FIG. 8 that reflect between interior surface 124 of dielectric cover layer 122 and conductive shield layer 130).

When phased antenna array 60 is provided with conductive pocket 140 (FIG. 9), conductive sidewalls 146 and 144 may change the angle (phase) of the radio-frequency signals reflecting back towards interior surface 124 so that the reflected signals are not out of phase with the radio-frequency signals transmitted by phased antenna array 60. This may minimize or eliminate the destructive interference associated with signals 134 of FIG. 8. Curve 151 illustrates a radiation pattern envelope of phased antenna array 60 with conductive pocket 140 (FIG. 9). As shown by curve 151 of FIG. 10, phased antenna array 60 may exhibit a more uniform radiation pattern envelope (gain) across all angles relative to curve 153 (e.g., because of the elimination of the destructive interference associated with signals 134 of FIG. 8). This minimization of destructive interference, as well as the optimization of isolation and the mitigation of surface wave propagation beyond cavity 150 provided by conductive pocket 140 of FIG. 9, may serve to increase the overall gain of phased antenna array 60 across the hemisphere above the X-Y plane of FIG. 10 relative to scenarios in which conductive pocket 140 is omitted, for example.

As shown in FIG. 10, angle of elevation Ø of conductive sidewalls 144 and 146 (FIG. 9) may be approximately aligned with the minimum angle above the X-Y plane of radiation pattern envelope 151. Angle of elevation Ø may, for example, be defined by the beam width of radiation pattern envelope 151 (e.g., a beam width defined by a predetermined amount of the electromagnetic energy associated with radiation pattern envelope 151 lying within cone 155). If desired, angle of elevation Ø of conductive sidewalls 144 and 146 may be increased beyond the upper limit defined by cone 155 (e.g., angle of elevation Ø may be extended to within the radiation pattern envelope of phased antenna array 60) to tweak the radiation pattern envelope to exhibit different shapes or to direct the antenna gain in different directions.

The example of FIG. 10 is merely illustrative. In general, radiation pattern envelopes 151 and 153 may exhibit other shapes. The radiation pattern envelopes shown in FIG. 10 illustrate a two-dimensional cross-sectional side view of the radiation pattern envelopes. In general, radiation pattern envelopes for antenna array 60 are three-dimensional.

Figure 11:
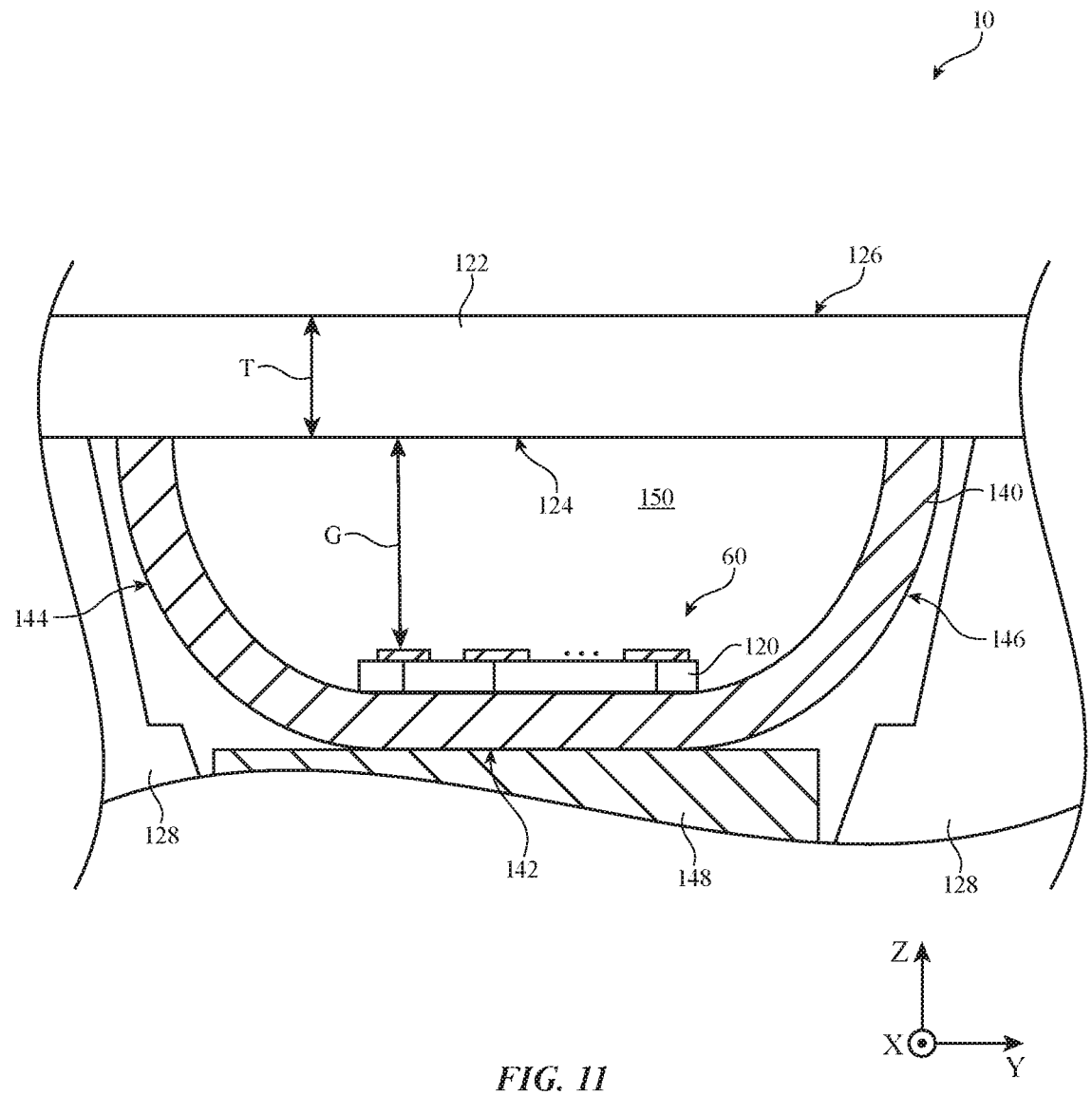
FIG. 11 is a cross-sectional side view of an illustrative antenna module mounted within a conductive shielding pocket having curved walls in accordance with an embodiment.

The example of FIG. 9 in which conductive sidewalls 144 and 146 of conductive pocket 140 have the same length, shape, and angle of elevation is merely illustrative. If desired, conductive sidewalls 144 and 146 may have a curved shape. FIG. 11 is a cross-sectional side view showing how conductive sidewalls 144 and 146 may have a curved shape.

As shown in FIG. 11, sidewalls 144 and 146 may be curved from conductive rear wall 142 to dielectric cover layer 122. Conductive sidewalls 144 and 146 may be continuously curved from conductive rear wall 142 to dielectric cover layer 122 or only a portion of conductive sidewalls 144 and 146 may be continuously curved. Conductive sidewalls 144 and 146 may have the same radius of curvature or may have different radii of curvature. Conductive sidewalls 144 and 146 may meet dielectric cover layer 122 at an angle normal to interior surface 124 or may meet display cover layer at another positive or negative (e.g., non-zero) angle with respect to the normal axis of interior surface 124.

Conductive rear wall 142 may be planar or may be curved if desired. In scenarios where conductive rear wall 142 is curved, substrate 120 or an additional substrate below phased antenna array 60 may have a lower surface that is curved to mate with conductive rear wall 142. If desired, substrate 120 may be flexible or may curve to mate with conductive rear wall 142. In this way, cavity 150 may have curved sides defined by one or more of conductive walls 142, 144, and 146 of conductive pocket 140.

Providing conductive pocket 140 with curved walls may tweak the reflective properties of conductive pocket 140 (e.g., to adjust the amount of destructive interference between transmitted and reflected signals within cavity 150), may tweak radiation pattern 151 of phased antenna array 60 (FIG. 10) to exhibit a desired shape and/or directionality, and/or may allow conductive pocket 140 to conform to the shape of other components such as components 128 within device 10, as examples.

Figure 12:
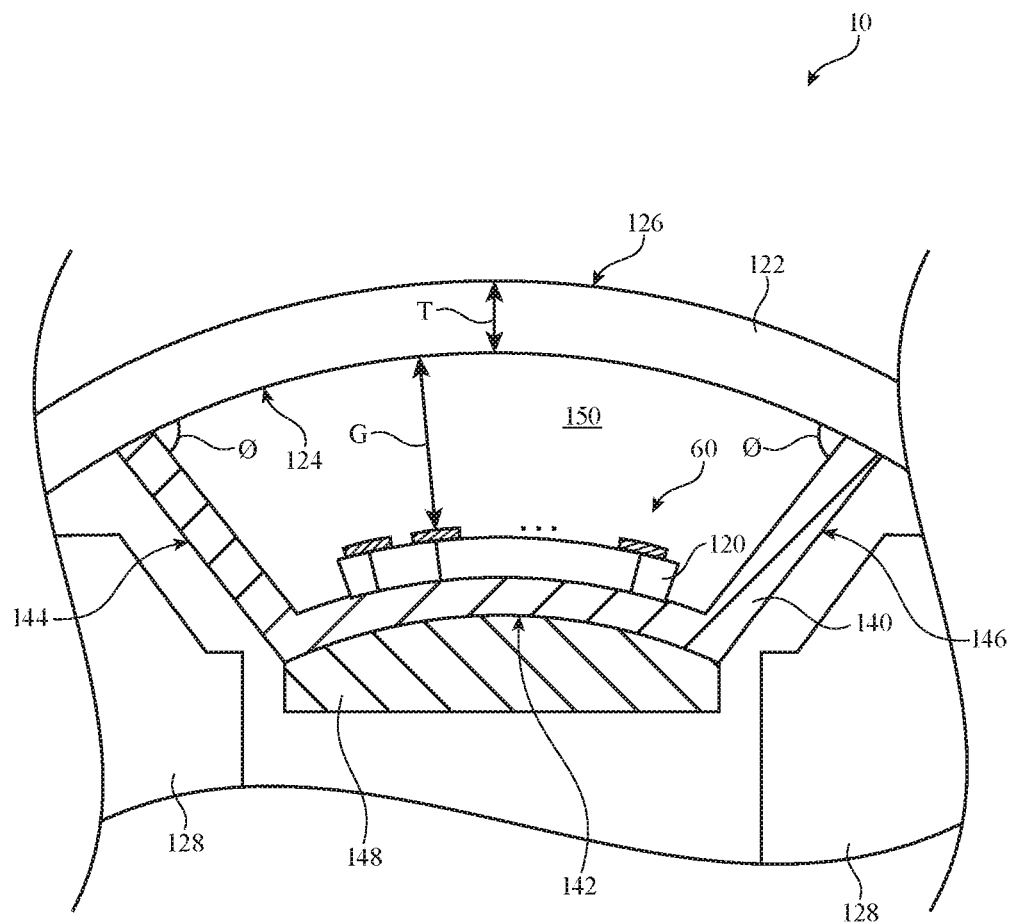
FIG. 12 is a cross-sectional side view of an illustrative antenna module mounted within a conductive shielding pocket behind a curved dielectric cover layer in accordance with an embodiment.

If desired, dielectric cover layer 122 and conductive rear wall 142 may both have a curved shape. FIG. 12 is a cross-sectional side view showing how dielectric cover layer 122 and conductive rear wall 142 may both have a curved shape.

As shown in FIG. 12, dielectric cover layer 122 may have a curved shape (e.g., interior surface 124 and/or exterior surface 126 may be curved with the same radius of curvature or with different radii of curvature). Providing dielectric cover layer 122 with a curved shape may, for example, allow the dielectric cover layer to conform to a desired form factor for device 10. For example, dielectric cover layer 122 may be used to form some or all of curved housing sidewalls 12E of FIG. 3 (e.g., in scenarios where some or all of device 10 has a cylindrical shape).

Conductive rear wall 142 may have a curved shape (e.g., a curved shape having a radius of curvature equal to that of dielectric cover layer 122 or having a radius of curvature different than that of dielectric cover layer 122). In another suitable arrangement, conductive rear wall 142 may be planar or may have other shapes. In scenarios such as the arrangement shown in FIG. 12 where conductive rear wall 142 has a curved shape, phased antenna array 60 may be curved to conform to the curved shape of conductive rear wall 142 (e.g., substrate 120 of phased antenna array 60 may be a flexible substrate or may be a rigid substrate formed in a curved shape).

Conductive sidewalls 144 and 146 may extend from ends of conductive rear housing wall 142 to dielectric cover layer 122. Conductive sidewalls 144 and 146 may meet dielectric cover layer 122 at angle Ø (e.g., an angle between about −80 degrees and +80 degrees with respect to the normal axis of interior surface 124). Conductive sidewalls 144 and 146 may meet dielectric cover layer 122 at the same angle Ø or may each meet dielectric cover layer 122 at different angles.

Figure 13:
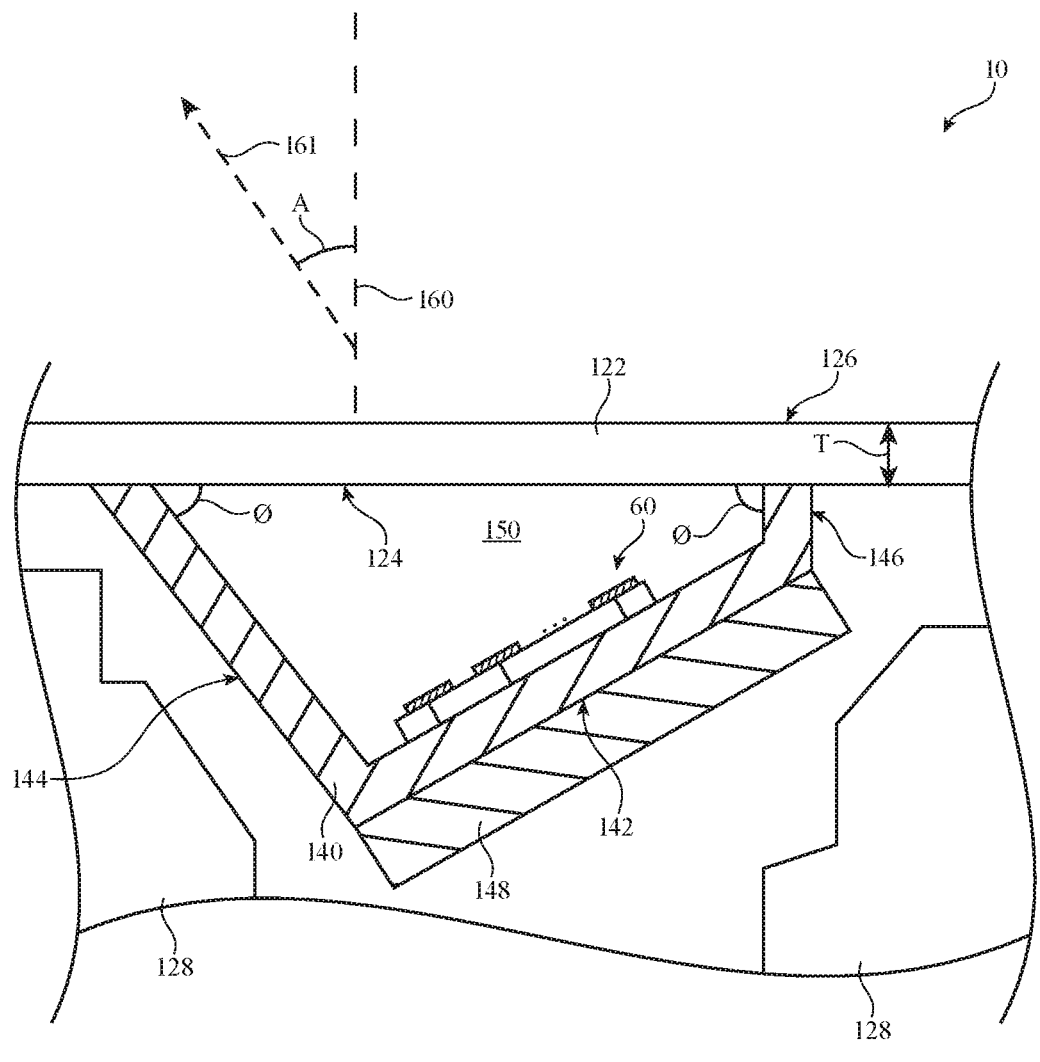
FIG. 13 is a cross-sectional side view of an illustrative antenna module mounted within an angled conductive shielding pocket for pointing the antenna module in a particular direction in accordance with an embodiment.

The example of FIG. 12 in which dielectric cover layer 122 and conductive rear wall 142 are continuously curved is merely illustrative. If desired, dielectric cover layer 122 and/or conductive rear wall 142 may have planar and curved portions or may have any other desired shapes. If desired, conductive sidewalls 144 and/or 146 may be curved (e.g., as shown in FIG. 13). In this way, conductive pocket 140 may allow phased antenna array 60 to be placed within a device having curved housing walls such as a cylindrically shaped device while also minimizing surface wave propagation, destructive interference within cavity 150, and heat within cavity 150.

If desired, conductive pocket 140 may be oriented (tilted) at an angle with respect to dielectric cover layer 122 (e.g., so that phased antenna array 60 points in a desired direction). FIG. 13 is a cross-sectional side view showing how conductive pocket 140 may be tilted at an angle with respect to dielectric cover layer 122.

As shown in FIG. 13, dielectric cover layer 122 may have a normal axis 160. Conductive rear wall 142 of conductive pocket 140 and phased antenna array 60 may both be tilted with respect to dielectric cover layer 122 such that conductive rear wall 142 and phased antenna array 60 each have a normal axis 161 that is tilted at a non-zero angle A with respect to normal axis 160 of display cover layer 122. When arranged in this way, conductive sidewalls 144 and 146 may have different lengths (e.g., conductive sidewall 146 may be shorter than conductive sidewall 144). Conductive sidewalls 144 and 146 may meet dielectric cover layer 122 at angle Ø. If desired, conductive sidewalls 144 and 146 may meet dielectric cover layer 122 at different respective angles.

By tilting phased antenna array 60 in this way, the radiation pattern of phased antenna array 60 may be pointed in a desired direction (e.g., with a maximum gain in a direction that is tilted A degrees with respect to normal axis 160). For example, phased antenna array 60 may be oriented towards an expected location of external wireless equipment given an expected usage scenario for device 10. Tilting phased antenna array 60 and conductive rear housing wall 142 in this way may also allow conductive pocket 140 to accommodate the shape of other components 128 adjacent to conductive pocket 140 if desired.

The example of FIG. 13 is merely illustrative. In general, phased antenna array 60 may be pointed in any desired direction (e.g., in three dimensions). Conductive sidewalls 144 and/or 146 may be curved (e.g., as shown in FIG. 11), conductive rear wall 142 may be curved, and/or dielectric cover layer 122 may be curved (e.g., as shown in FIG. 12).

Figure 14:
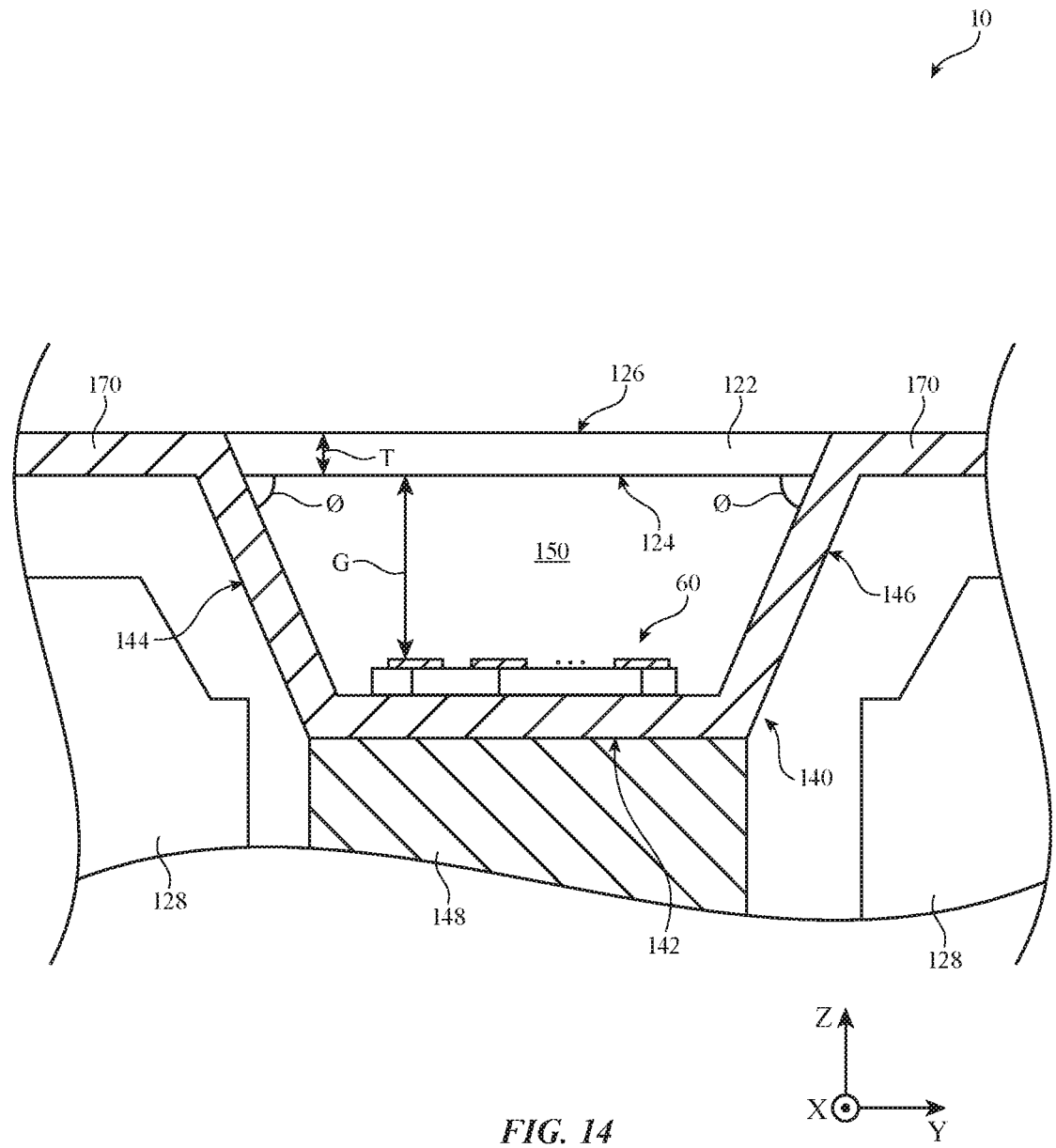
FIG. 14 is a cross-sectional side view of an illustrative antenna module mounted within a conductive shielding pocket formed from an integral portion of a conductive electronic device housing wall in accordance with an embodiment.

If desired, conductive pocket 140 may be formed from a continuous and integral portion of a conductive housing for device 10. FIG. 14 is a cross-sectional side view showing how conductive pocket 140 may be formed from an integral portion of a conductive housing for device 10.

As shown in FIG. 14, device 10 may include conductive housing wall 170 (e.g., a conductive portion of housing 12 of FIGS. 2 and 3). Conductive housing wall 170 may form an exterior surface of device 10 or may be covered by a thin layer of dielectric material such as a protective and/or cosmetic coating. Conductive sidewalls 144 and 146 of conductive pocket 140 may be formed from a continuous and integral portion of conductive housing wall 170 that has been angled downwards (e.g., by angle Ø). Conductive rear wall 142 of conductive pocket 140 may be formed from a continuous and integral portion of conductive housing wall 170 that extends between conductive sidewalls 144 and 146. Dielectric cover layer 122 may be formed over phased antenna array 60 in conductive pocket 140 to enclose cavity 150 between conductive pocket 140 and dielectric cover layer 122. Dielectric cover layer 122 may have the same thickness T as conductive housing wall 170 or may have a thickness different than that of conductive housing wall 170. Exterior surface 126 of dielectric cover layer 122 may lie flush with the exterior surface of conductive housing wall 170, may protrude from conductive housing wall 170, or may form an indentation in conductive housing wall 170.

Forming conductive pocket 140 from an integral portion of conductive housing wall 170 may optimize the structural (mechanical) integrity of device 10 and conductive pocket 140 and/or minimize manufacturing cost and complexity for device 10, as examples. The example of FIG. 14 is merely illustrative. Conductive sidewalls 144 and 146 may extend towards the interior of device 10 at any desired angle or at different angles if desired. Conductive sidewalls 144 and/or 146 may be curved (e.g., as shown in FIG. 11), conductive rear wall 142 may be curved, dielectric cover layer 122 may be curved (e.g., as shown in FIG. 12), and/or conductive rear wall 142 and phased antenna array 60 may be tilted to point in a desired direction (e.g., as shown in FIG. 13).

Figure 15:
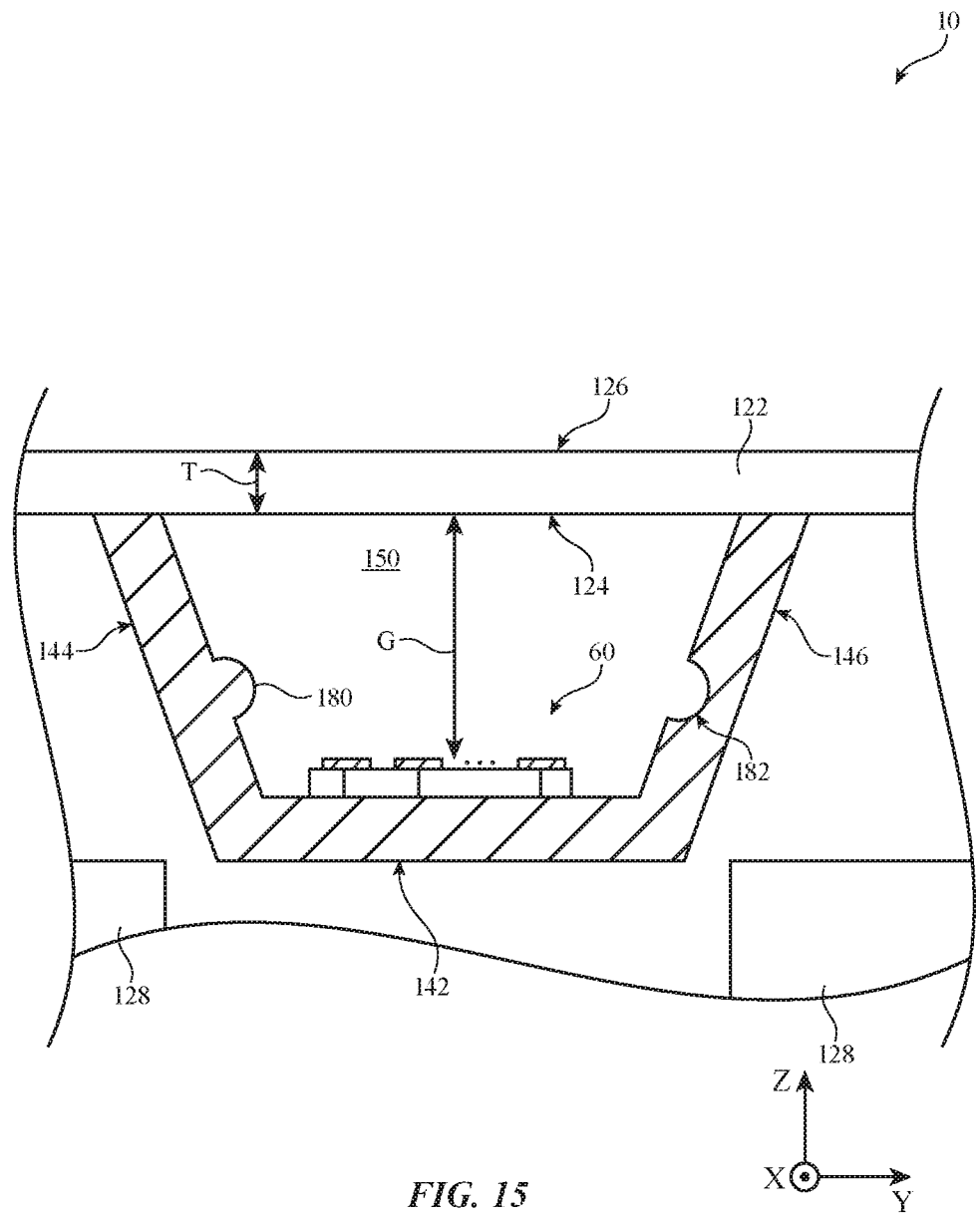
FIG. 15 is a cross-sectional side view of an illustrative antenna module mounted within a conductive shielding pocket having localized perturbations for mitigating destructive interference in accordance with an embodiment.

If desired, one or more walls of conductive pocket 140 may include local perturbations for tweaking destructive interference within cavity 150. FIG. 15 is a cross-sectional side view showing how conductive pocket 140 may include local perturbations.

As shown in FIG. 15, conductive sidewall 144 may include a localized perturbation such as bump 180 and conductive sidewall 146 may include a localized perturbation such as hole or dimple 182. Perturbations such as bump 180 and dimple 182 may tweak the boundary conditions (dimensions) of cavity 150 and conductive pocket 140 to help to ensure that radio-frequency signals reflected off of interior surface 124 of dielectric cover layer 122 do not destructively interfere with the radio-frequency signals reflected off of the walls of conductive pocket 140.

Perturbations such as bump 180 and dimple 182 may have any desired convex and/or concave shapes and may have any desired sizes (e.g., as selected to minimize destructive interference within cavity 150). Perturbations such as bump 180 and/or dimple 182 may be formed in conductive rear wall 142 if desired. Zero, one, or more than one perturbation may be formed in each wall of conductive pocket 140.

The examples of FIGS. 9 and 11-15 are merely illustrative. In general, dielectric cover 122 of FIGS. 9 and 11-15 may have any desired shape (e.g., interior surface 124 may be curved or may include multiple localized curves or cavities, exterior surface 126 may be curved or may include multiple localized curves or bumps, thickness T may vary across the lateral area of dielectric cover layer 122, etc.). Any desired combination of the structures shown in FIGS. 9 and 11-15 may be used. For example, conductive sidewalls 144 and/or 146 may be curved (e.g., as shown in FIG. 11), conductive rear wall 142 may be curved and/or dielectric cover layer 122 may be curved (e.g., as shown in FIG. 12), conductive rear wall 142 and/or phased antenna array 70 may be tilted to point in a desired direction (e.g., as shown in FIG. 13), conductive pocket 140 may be formed from an integral portion of conductive housing wall 170 (e.g., as shown in FIG. 14), and/or localized perturbations such as bumps 180 and dimples 182 (e.g., as shown in FIG. 15) may be formed in one or more conductive walls of conductive pocket 140. The shapes and arrangement of these structures may be selected to tweak destructive interference within cavity 150 over different angles, to point the radiation pattern of phased antenna array 60 towards a desired angle, to conform to form factor and space consumption requirements for device 10, and/or to exhibit a desired radiation pattern envelope (e.g., a desired radiation pattern envelope shape), while concurrently optimizing radiation pattern envelope uniformity across the hemisphere above phased antenna array 60, blocking surface waves (e.g., surface waves 132 of FIG. 8) from propagating outside of cavity 150, and sufficiently dissipating heat away from phased antenna array 60. More than one phased antenna array 60 may be mounted within conductive pocket 140 if desired.

Figure 16:
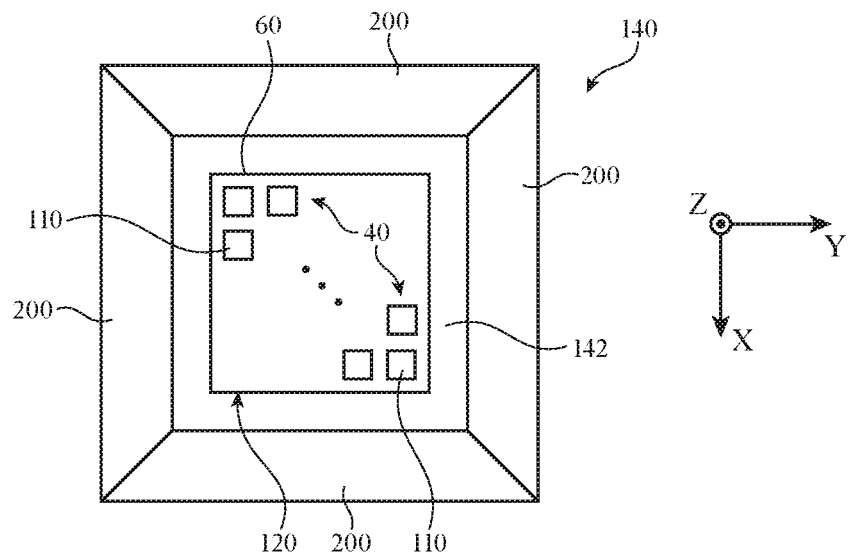
FIGS. 16-18 are top-down views of illustrative conductive shielding pockets of the types shown in FIGS. 9 and 11-15 in accordance with an embodiment.
Figure 17:
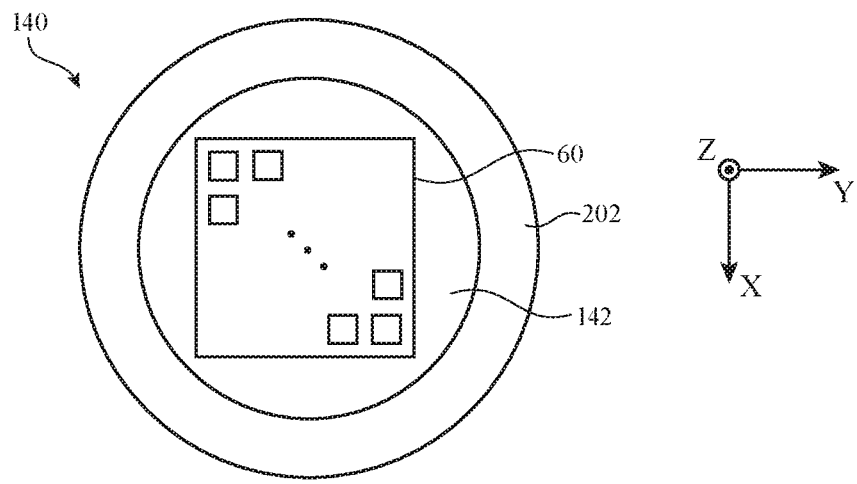
Figure 18:
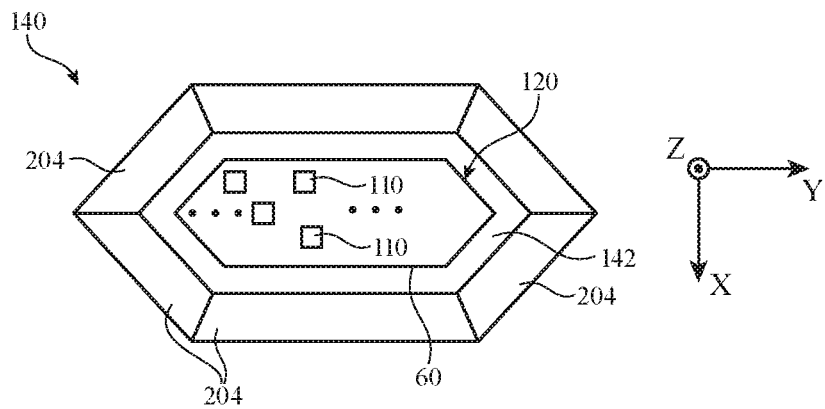

The examples of FIGS. 9 and 11-15 are cross-sectional side views of conductive pocket 140. In general, conductive pocket 140 may have any desired lateral outline or footprint (e.g., within the X-Y plane of FIGS. 9-15). FIGS. 16-18 are top-down views showing how conductive pocket 140 may have different lateral outlines or footprints.

In the example of FIG. 16, conductive pocket 140 has a rectangular (e.g., square) lateral outline or footprint (e.g., in the X-Y plane of FIG. 16). In this scenario, conductive rear wall 142 has a rectangular outline (periphery). Four conductive sidewalls 200 (e.g., four conductive sidewalls such as conductive sidewalls 144 and 146 of FIGS. 9 and 11-15) extend from conductive rear wall 142 towards dielectric cover layer 122 of FIGS. 9 and 11-15 (e.g., in the direction of the Z-axis of FIG. 16). Phased antenna array 60 may be mounted to conductive rear wall 142.

In the example of FIG. 17, conductive pocket 140 has an elliptical or circular lateral outline. In this scenario, conductive rear wall 142 has an elliptical or circular outline and a single continuous conductive sidewall 202 extends around the periphery of conductive rear wall 142 and towards dielectric cover layer 122. In this type of arrangement, conductive sidewalls 144 and 146 of FIGS. 9 and 11-15 may represent opposing sides of the same continuous conductive sidewall 202, for example.

In the example of FIG. 18, conductive pocket 140 has a hexagonal lateral outline. In this scenario, conductive rear wall 142 has a hexagonal outline (periphery) that is coupled to six conductive sidewalls 204 extending towards dielectric cover layer 122. Phased antenna array 60 may have a hexagonal shape that conforms to the hexagonal outline of conductive rear wall 142 if desired.

The examples of FIGS. 16-18 are merely illustrative. In general, conductive pocket 140 may have any desired lateral outline (e.g., a triangular outline, a pentagonal outline, a polygonal outline, an outline having any desired number of curved and/or straight edges, etc.). Different lateral outlines may allow conductive pocket 140 to conform to different space requirements or device form factors, may tweak the destructive interference within cavity 150, and may optimize the uniformity and directionality of the radiation pattern for phased antenna array 60 in any desired manner. Phased antenna array 60 (e.g., substrate 120) may have any desired outline that conforms or does not conform to the shape of conducive rear wall 142. Any desired number of patch elements 110 may be formed within phased antenna array 60 in any desired arrangement or pattern. In general, any combinations of the arrangements of FIGS. 9 and 11-18 may be used if desired.

The foregoing is merely illustrative and various modifications can be made to the described embodiments. The foregoing embodiments may be implemented individually or in any combination.

What is claimed is:

1. An electronic device comprising:
   a conductive pocket;
   a dielectric cover layer mounted over the conductive pocket, the conductive pocket and the dielectric cover layer defining a cavity, wherein the conductive pocket comprises a conductive rear wall and conductive sidewalls extending from the conductive rear wall to the dielectric cover layer, and the conductive sidewalls are affixed to the dielectric cover layer;
   transceiver circuitry configured to generate radio-frequency signals at a frequency greater than 10 GHz; and
   a phased antenna array mounted to the conductive pocket within the cavity and configured to transmit the radio-frequency signals through the dielectric cover layer.

2. The electronic device defined in claim 1, wherein the phased antenna array comprises a substrate, a plurality of antenna resonating elements on the substrate, and a ground plane that is embedded within the substrate and interposed between the plurality of antenna resonating elements and the conductive rear wall.

3. The electronic device defined in claim 1, wherein the dielectric cover layer has a curved shape.

4. The electronic device defined in claim 3, wherein the conductive rear wall has a curved shape, and the conductive rear wall has a first radius of curvature and the dielectric cover layer has a second radius of curvature that is equal to the first radius of curvature.

5. The electronic device defined in claim 1, wherein the conductive pocket and the cavity are non-resonant at the frequency, the conductive pocket is configured to mitigate destructive interference of the radio-frequency signals within the conductive pocket, the conductive sidewalls extend from the dielectric cover layer at a non-zero angle with respect to a normal axis of the dielectric cover layer, and the phased antenna array is mounted to the conductive rear wall, the electronic device comprising:
   a housing that includes the dielectric cover layer; and
   a display mounted to the housing.

6. The electronic device defined in claim 1, wherein the dielectric cover layer has a first normal axis, the conductive sidewalls comprise a first conductive sidewall and a second conductive sidewall that is shorter than the first conductive sidewall, and the conductive rear wall and the phased antenna array have a second normal axis that is oriented at a non-zero angle with respect to the first normal axis.

7. The electronic device defined in claim 1, wherein the conductive sidewalls have a continuously curved shape from the conductive rear wall to the dielectric cover layer.

8. The electronic device defined in claim 1, wherein the conductive sidewalls comprise a local perturbation configured to mitigate destructive interference of the radio-frequency signals within the cavity.

9. The electronic device defined in claim 1, wherein the conductive rear wall has a lateral outline selected from the group consisting of: a circular lateral outline, an elliptical lateral outline, a rectangular lateral outline, and a hexagonal lateral outline.

10. The electronic device defined in claim 1, further comprising:
    a heat spreader coupled to the conductive rear wall using a conductive interconnect structure selected from the group consisting of: thermal paste, solder, a weld, and a conductive screw, wherein the heat spreader is configured to dissipate heat away from the conductive pocket.

11. The electronic device defined in claim 1, wherein the cavity and the conductive pocket are non-resonant at the frequency.

12. The electronic device defined in claim 1, wherein the conductive pocket is configured to mitigate destructive interference of the radio-frequency signals within the conductive pocket, the conductive sidewalls extend from the dielectric cover layer at a non-zero angle with respect to a normal axis of the dielectric cover layer.

13. The electronic device defined in claim 1, wherein the conductive sidewalls are connected to the dielectric cover layer at a non-zero angle with respect to a normal axis of the dielectric cover layer and the phased antenna array is mounted to the conductive rear wall.

14. An electronic device comprising:

a conductive pocket;

a housing that includes a dielectric cover layer, the dielectric cover layer being mounted over the conductive pocket, and the conductive pocket and the dielectric cover layer defining a cavity, wherein the conductive pocket comprises a conductive rear wall and conductive sidewalls extending from the conductive rear wall to the dielectric cover layer at a non-zero angle with respect to a normal axis of the dielectric cover layer;

transceiver circuitry configured to generate radio-frequency signals at a frequency greater than 10 GHz; and a phased antenna array mounted to the conductive rear wall and within the cavity and configured to transmit the radio-frequency signals through the dielectric cover layer, wherein the conductive pocket is configured to mitigate destructive interference of the radio-frequency signals within the conductive pocket.

15. An electronic device comprising:

a conductive pocket;

a dielectric cover layer mounted over the conductive pocket, the conductive pocket and the dielectric cover layer defining a cavity, wherein the conductive pocket comprises a conductive rear wall and conductive sidewalls extending from the conductive rear wall to the dielectric cover layer and the conductive sidewalls are connected to the dielectric cover layer at a non-zero angle with respect to a normal axis of the dielectric cover layer;

transceiver circuitry configured to generate radio-frequency signals at a frequency greater than 10 GHz; and a phased antenna array mounted to the conductive pocket within the cavity and configured to transmit the radio-frequency signals through the dielectric cover layer.

\* \* \* \* \*